(12) United States Patent
Youn et al.

(10) Patent No.: US 11,363,664 B2
(45) Date of Patent: Jun. 14, 2022

(54) METHOD FOR TRANSMITTING SM SIGNAL TO TERMINAL CAPABLE OF CONNECTING TO PLURALITY OF NETWORK SYSTEMS

(71) Applicant: LG ELECTRONICS INC., Seoul (KR)

(72) Inventors: Myungjune Youn, Seoul (KR); Laeyoung Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/967,403

(22) PCT Filed: Feb. 12, 2019

(86) PCT No.: PCT/KR2019/001694
§ 371 (c)(1),
(2) Date: Aug. 4, 2020

(87) PCT Pub. No.: WO2019/160300
PCT Pub. Date: Aug. 22, 2019

(65) Prior Publication Data
US 2021/0219371 A1 Jul. 15, 2021

Related U.S. Application Data

(60) Provisional application No. 62/631,959, filed on Feb. 19, 2018.

(30) Foreign Application Priority Data

Jan. 11, 2019 (KR) .................. 10-2019-0003641

(51) Int. Cl.
*H04W 4/00* (2018.01)
*H04W 76/20* (2018.01)
*H04W 48/18* (2009.01)

(52) U.S. Cl.
CPC ........... *H04W 76/20* (2018.02); *H04W 48/18* (2013.01)

(58) Field of Classification Search
CPC ..... H04W 76/20; H04W 48/18; H04W 48/00; H04W 52/28; H04W 76/00; H04W 76/10;
(Continued)

(56) References Cited

U.S. PATENT DOCUMENTS

2017/0339609 A1    11/2017  Youn et al.
2019/0116546 A1*    4/2019  Kang ............... H04W 68/02

FOREIGN PATENT DOCUMENTS

WO    2017/142362    8/2017

OTHER PUBLICATIONS

PCT International Application No. PCT/KR2019/001694, International Search Report dated May 21, 2019, 2 pages.
(Continued)

*Primary Examiner* — Huy C Ho
(74) *Attorney, Agent, or Firm* — Lee Hong Degerman Kang Waimey

(57) ABSTRACT

To achieve the aforementioned objective, one disclosure of the present specification may provide a method for transmitting an SM signal to a terminal capable of connecting to a plurality of access networks. The method may comprise the steps of: an AMF node receiving a request for transmission of the SM signal from an SMF node, the request comprising information about an access network to transmit the SM signal; the AMF node determining an access network to transmit the SM signal to the terminal on the basis of information about the access network; and if the terminal is connected to the AMF node via the determined access network, the AMF node transmitting the SM signal to the terminal via the determined access network.

18 Claims, 24 Drawing Sheets

(58) Field of Classification Search
CPC ..... H04W 76/15; H04W 76/16; H04W 76/18; H04W 76/19
USPC ........................................................ 370/328
See application file for complete search history.

(56) References Cited

OTHER PUBLICATIONS

3GPP; TSGSA; Procedures for the 5G System; Stage 2 (Release 15), 3GPP TS 23.502, V15.0.0, Dec. 22, 2017, 259 pages.
3GPP; TSGSA; System Architecture for the 5G System; Stage 2 (Release 15), 3GPP TS 23.501, V15.0.0, Dec. 22, 2017, 183 pages.
ETRI, "Updating Network Triggered Service Request to support selective re-activation of PDU session over non-3GPP access," 3GPP TSG-SA2 Meeting #125, S2-181021, Gothenburg, Sweden, Jan. 22-26, 2018, 9 pages.

* cited by examiner

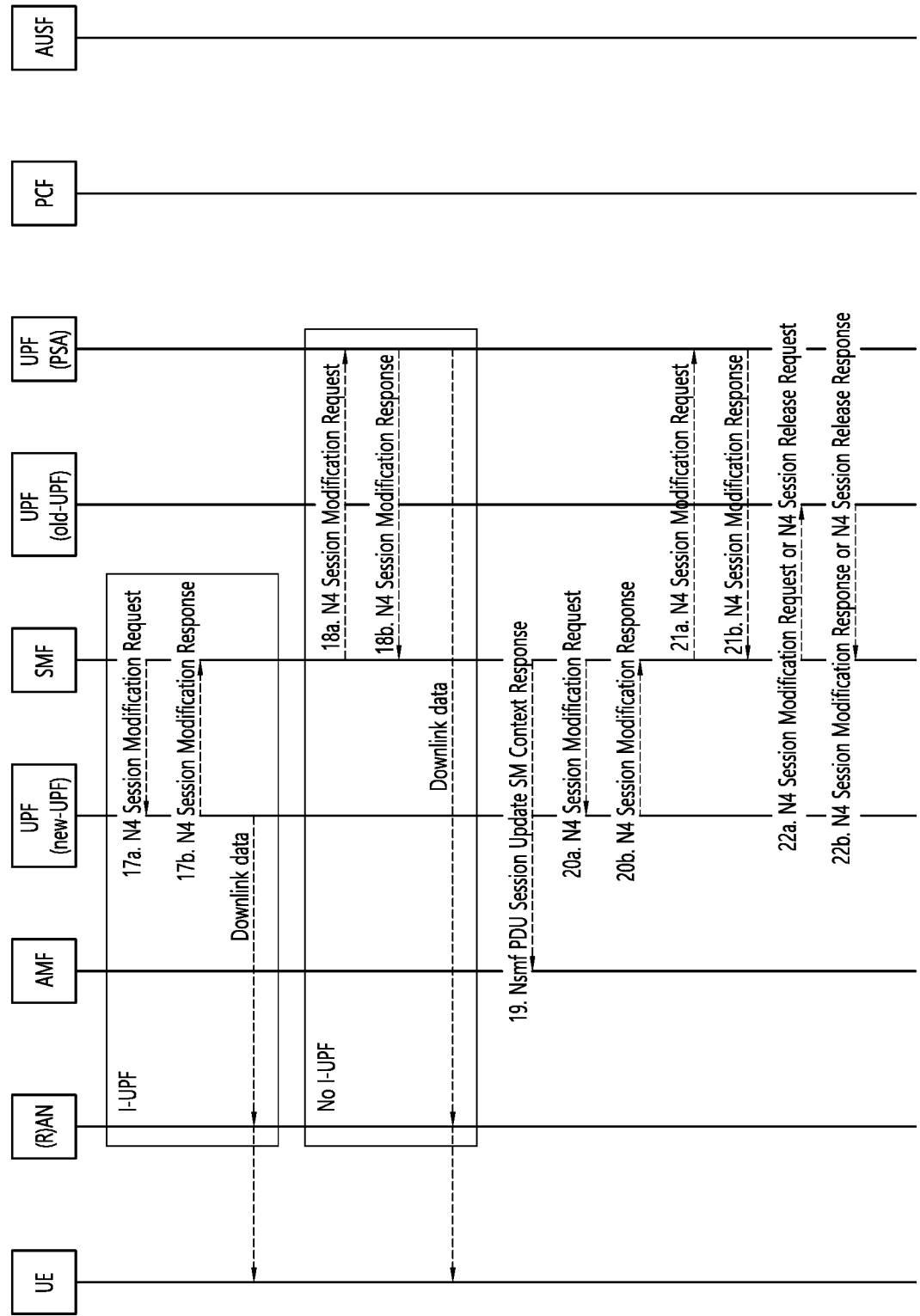

METHOD FOR TRANSMITTING SM SIGNAL TO TERMINAL CAPABLE OF CONNECTING TO PLURALITY OF NETWORK SYSTEMS

CROSS-REFERENCE TO RELATED APPLICATIONS

This application is the National Stage filing under 35 U.S.C. 371 of International Application No. PCT/KR2019/001694, filed on Feb. 12, 2019, which claims the benefit of U.S. Provisional Application No. 62/631,959, filed on Feb. 19, 2018, and also claims the benefit of earlier filing date and right of priority to Korean Application No. 10-2019-0003641, filed on Jan. 11, 2019, the contents of which are all hereby incorporated by reference herein in their entirety.

BACKGROUND OF THE DISCLOSURE

Field of the Disclosure

The present disclosure relates to a next generation mobile communication, e.g., 5G mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) (52), a Packet Data Network Gateway (PDN GW) (53), a Mobility Management Entity (MME) (51), a Serving General Packet Radio Service (GPRS) Supporting Node (SGSN), and an enhanced Packet Data Gateway (ePDG) that correspond to some of the various elements.

The S-GW (52) is an element that operates at a boundary point between a Radio Access Network (RAN) and a core network and has a function of maintaining a data path between an eNodeB (22) and the PDN GW (53). Furthermore, if a terminal (or User Equipment (UE) moves in a region in which service is provided by the eNodeB (22), the S-GW (52) plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW (52). Furthermore, the S-GW (52) may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) (53) corresponds to the termination point of a data interface toward a packet data network. The PDN GW (53) can support policy enforcement features, packet filtering, charging support, and so on. Furthermore, the PDN GW (or P-GW) (53) can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW (52) and the PDN GW (53) have been illustrated as being separate gateways, but the two gateways may be implemented in accordance with a single gateway configuration option.

The MME (51) is an element for performing the access of a terminal to a network connection and signaling and control functions for supporting the allocation, tracking, paging, roaming, handover, and so on, of network resources. The MME (51) controls control plane functions related to subscribers and session management. The MME (51) manages numerous eNodeBs (22) and performs conventional signaling for selecting a gateway for handover to another 2G/3G networks. Furthermore, the MME (51) performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in |

TABLE 1-continued

| REFERENCE POINT | DESCRIPTION |
|---|---|
| | idle and/or activation state. This reference point can be used intra-PLMN or inter-PLMN (e.g. in the case of Inter-PLMN HO). |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next-Generation Mobile Communication Network>

With the success of long term evolution (LTE)/LTE-Advanced (LTE-A) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The ITU proposes three usage scenarios, e.g., enhanced Mobile BroadBand (eMBB), massive Machine Type Communication (mMTC), and Ultra Reliable and Low Latency Communications (URLLC).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, it is urgently required to re-design the core network in 5G mobile communication.

FIG. 2 shows an example of an expected structure of next-generation mobile communication from a node perspective.

As can be seen with reference to FIG. 2, a UE is coupled to a data network (DN) via a next generation radio access network (RAN).

The illustrated control plane function (CPF) node performs the entirety or part of a mobility management entity (MME) function of 4G mobile communication and the entirety or part of a control plane function of an S-serving gateway (SG) and PDN gateway (P-GW). The CPF node includes an access and mobility management function (AMF) and a session management function (SMF).

The illustrated user plane function (UPF) node is a type of a gateway through which user data is transmitted/received. The UPF node may perform the entirety or part of a user plane function of an S-GW or P-GW of 4G mobile communication.

The illustrated policy control function (PCF) is a node which controls a provider's policy.

The illustrated application function (AF) is a server for providing several services to the UE.

The illustrated unified data management (UDM) is a type of a server which manages subscriber information, such as a home subscriber server (HSS) of 4G mobile communication. The UDM stores the subscriber information in a unified data repository (UDR) and manages it.

The illustrated authentication server function (AUSF) authenticates and manages the UE.

The illustrated network slice selection function (NSSF) is a node for network slicing as described below.

In the 3GPP system, a conceptual link connecting NFs in the 5G system is defined as a reference point. The following shows exemplary reference points being included in a 5G system architecture, as expressed in FIG. 2.

N1: Reference point between the UE and the AMF.
N2: Reference point between the (R)AN and the AMF.
N3: Reference point between the (R)AN and the UPF.
N4: Reference point between the SMF and the UPF.
N5: Reference point between the PCF and an AF.
N6: Reference point between the UPF and a Data Network.
N7: Reference point between the SMF and the PCF.
N24: Reference point between the PCF in the visited network and the PCF in the home network.
N8: Reference point between the UDM and the AMF.
N9: Reference point between two Core UPFs.
N10: Reference point between the UDM and the SMF.
N11: Reference point between the AMF and the SMF.
N12: Reference point between AMF and AUSF.
N13: Reference point between the UDM and Authentication Server function the AUSF.
N14: Reference point between two AMFs.
N15: Reference point between the PCF and the AMF if of non-roaming scenario, PCF in the visited network and AMF if of roaming scenario.
N16: Reference point between two SMFs, (in roaming case between SMF in the visited network and the SMF in the home network).
N17: Reference point between AMF and EIR.
N18: Reference point between any NF and UDSF.
N19: Reference point between NEF and SDSF.

FIG. 3 shows an example of an architecture for supporting simultaneous access to two data networks.

In the architecture shown in FIG. 3, a UE uses one PDU session to simultaneously access the two data networks.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 4A is an exemplary diagram illustrating an example of an architecture for implementing the concept of network slicing.

As can be seen from FIG. 4A, the core network (CN) may be divided into several slice instances. Each slice instance may contain one or more of a CP function node and a UP function node.

Each UE may use a network slice instance corresponding to its service through RAN.

Unlike the case shown in FIG. 4A, each slice instance may share one or more of a CP function node, and a UP function node with another slice instance. This will be described with reference to FIG. 4B below.

FIG. 4B is an exemplary view showing another example of an architecture for implementing the concept of network slicing.

Referring to FIG. 4B, a plurality of UP function nodes are clustered, and a plurality of CP function nodes are also clustered.

Further, referring to FIG. 4B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Roaming in Nest Generation Mobile Network>

Meanwhile, there are two types of a method for processing a signaling request from a UE while the UE roams to a visit network, for example, a visited public land mobile network (VPLMN). The first method is a local break out (LBO) method in which the signaling request from the UE is processed at the network. The second method is a home routing (HR) method in which the visit network transmits the signaling request from the UE to a home network of the UE.

FIG. 5A is a diagram illustrating an example of architecture to which the LBO method is applied during roaming, and FIG. 5B is a diagram illustrating an example of architecture to which the HR method is applied during roaming.

As illustrated in FIG. 5A, in the architecture to which the LBO method is applied, data of a user is transmitted to a data network in the VPLMN. To this end, a PCF in the VPLMN performs an interaction with an AF to create a PCC rule for a service in the VPLMN. A PCF node in the VPLMN creates the PCC rule based on a policy that is set according to a roaming agreement with a home public land mobile network (HPLMN) operator.

As illustrated in FIG. 5B, in the architecture to which the HR method is applied, the data of the UE is transmitted to the data network in the HPLMN.

<Data Offloading to Non-3GPP Network>

In next-generation mobile communication, data of a UE may be offloaded to a non-3GPP network, for example, a wireless local area network (WLAN) or a Wi-Fi.

FIGS. 6A to 6F illustrate architectures for offloading data to the non-3GPP network.

A WLAN or a Wi-Fi is regarded as an untrusted non-3GPP network. In order to connect the non-3GPP network to a core network, a non-3GPP interworking function (N3IWF) may be added.

Meanwhile, in a 5G system, if a 3GPP access network (e.g., 5G) and a non-3GPP access network (e.g., WIFI) are connected to a same Public Land Mobile Network (PLMN), a UE may receive a service from an AMF. Due to a selective user plane activation/deactivation, which is adopted in the 5G system, only the AMF manages the UE's state, and the SMF operates without knowing whether the UE is in a connection-management (CM)-IDLE state or a CM-CONNECTED state.

Therefore, if a target access network is in the CM-IDLE state, the AMF may transmit a signal to another access network. At this point, by failing to transmit a signal through the initially intended target access network, there may occur a problem of not being capable of performing checking of a target access network.

SUMMARY OF THE DISCLOSURE

Technical Solutions

In order to achieve the above-described technical object, a disclosure of this specification may provide a method for transmitting a session management (SM) signal to a user equipment (UE) capable of being connected to multiple access networks. The method may include the steps of receiving, by an access and mobility management function (AMF) node, from a session management function (SMF) node, a request for transmitting the SM signal, wherein the request includes information on an access network through which the SM signal is to be transmitted, determining, by the AMF node, an access network through which the SM signal is to be transmitted to the UE, based on the information on the access network, and, if the UE is connected to the AMF node through the determined access network, transmitting, by the AMF node, the SM signal to the UE through the determined access network.

The information on the access network through which the SM signal is to be transmitted may indicate that a signal is to be transmitted through an access network associated with a protocol data unit (PDU) session, or that a signal is to be transmitted through a specific access network regardless of an association or non-association with the PDU session.

The method may further include a step of determining whether or not to transmit the SM signal to the UE in accordance with whether or not the UE is connected to the determined access network.

If the UE is not connected to the AMF node through the determined access network, the AMF node may not transmit the SM signal to the UE.

If the UE is not connected to the AMF node through the determined access network, the method may further include a step of transmitting, by the AMF node, to the SMF node, information indicating that the SM signal cannot be transmitted to the UE through the determined access network.

If the UE is not connected to the AMF node through the determined access network, the AMF node may notify the SMF node that the UE is in a connection management (CM)-IDLE state for the determined access network.

The method may further include a step of receiving, by the AMF node, from the SMF node, a request for user plane activation, wherein whether or not to perform the user plane activation may be determined according to whether or not the UE is connected to the AMF node through the determined access network.

The request may include information on a validity area through which an SM signal can be transmitted, and the information on the access network through which the SM signal is to be transmitted may be transmitted by using the information on the validity area.

The validity area may be one of a 3GPP access network and a non-3GPP access network.

The validity area is configured through a tracking area (TA) list.

In order to achieve the above-described technical object, another disclosure of this specification may provide an access and mobility management function (AMF) node capable of being connected to a user equipment (UE) through multiple access networks. The AMF node may include a transceiver receiving a request for transmitting a session management (SM) signal from a session management function (SMF) node, and a processor controlling the transceiver, wherein the processor may determine an access network through which the SM signal is to be transmitted to the UE, based on the information on the access network, and, if the AMF node is connected to the UE through the determined access network, may transmit the SM signal to the UE through the determined access network.

EFFECTS OF THE DISCLOSURE

According to a disclosure of this specification, the present disclosure has an effect of preventing SM signals from being transmitted to an unintended access network.

BRIEF DESCRIPTION OF THE DRAWINGS

FIG. 9a to FIG. 9c show a UE-Triggered Service Request procedure.

DESCRIPTION OF EXEMPLARY EMBODIMENTS

Figure 1:
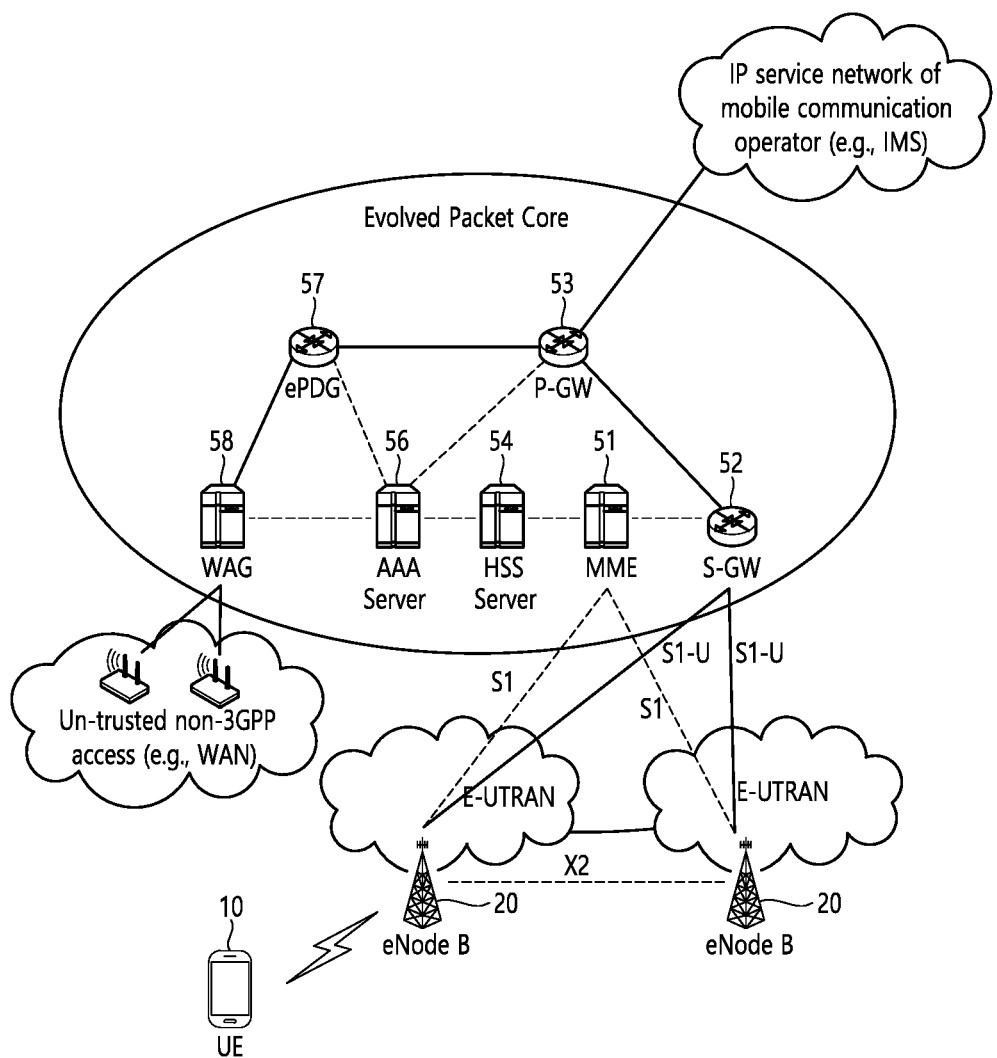
FIG. 1 shows the configuration of an evolved mobile communication network.
Figure 2:
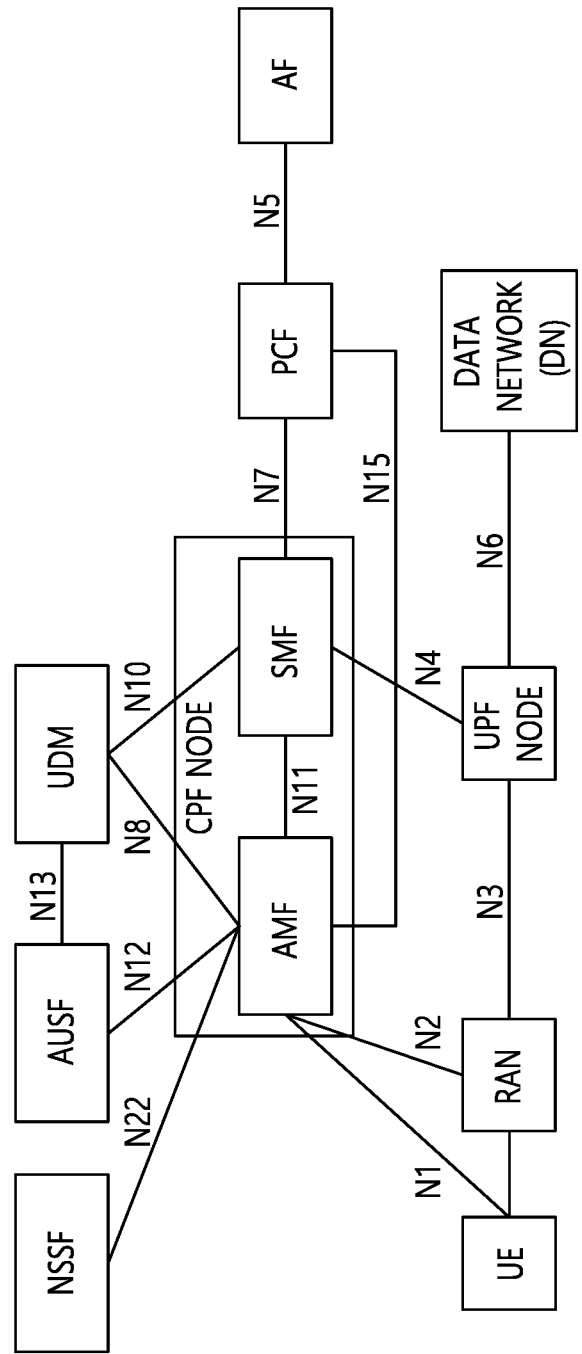
FIG. 2 shows an example of an expected structure of next-generation mobile communication from a node perspective.
Figure 3:
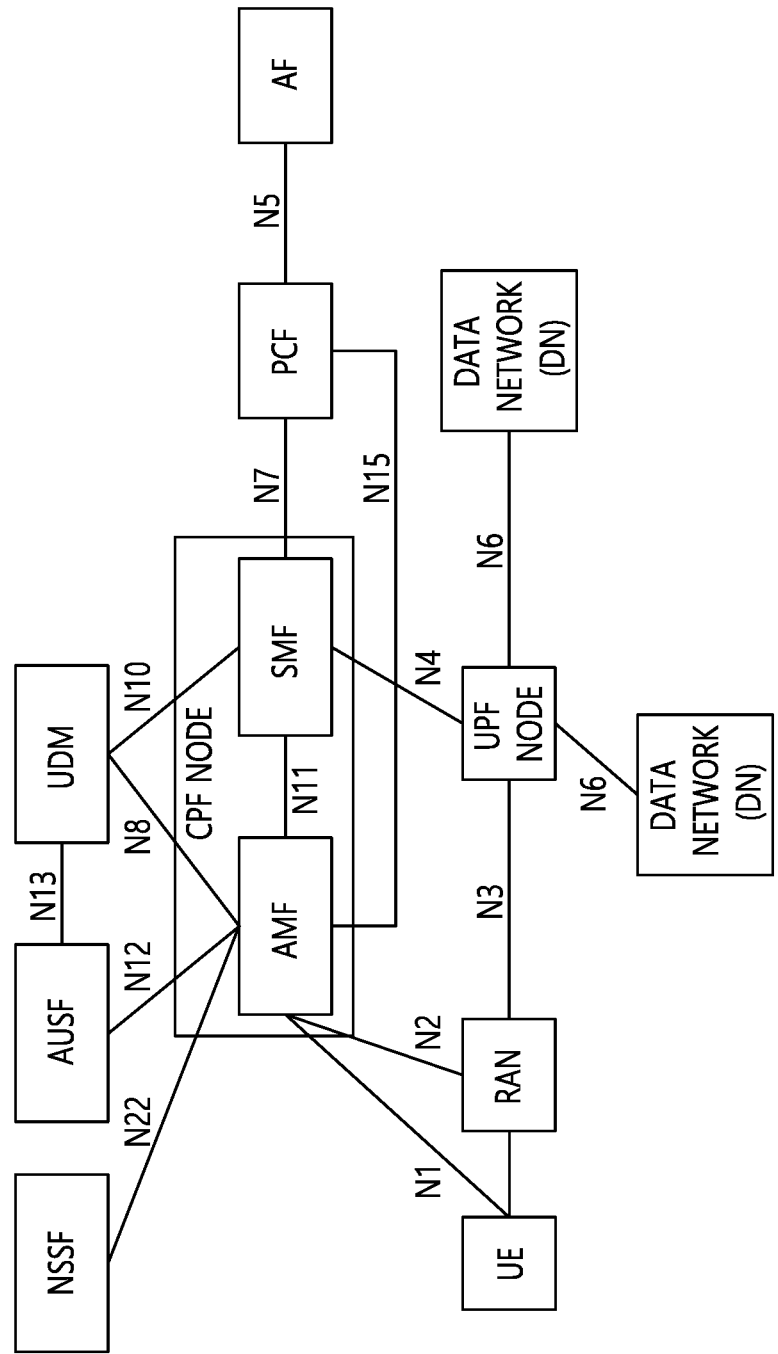
FIG. 3 shows an example of an architecture for supporting simultaneous access to two data networks.
Figure 4A:
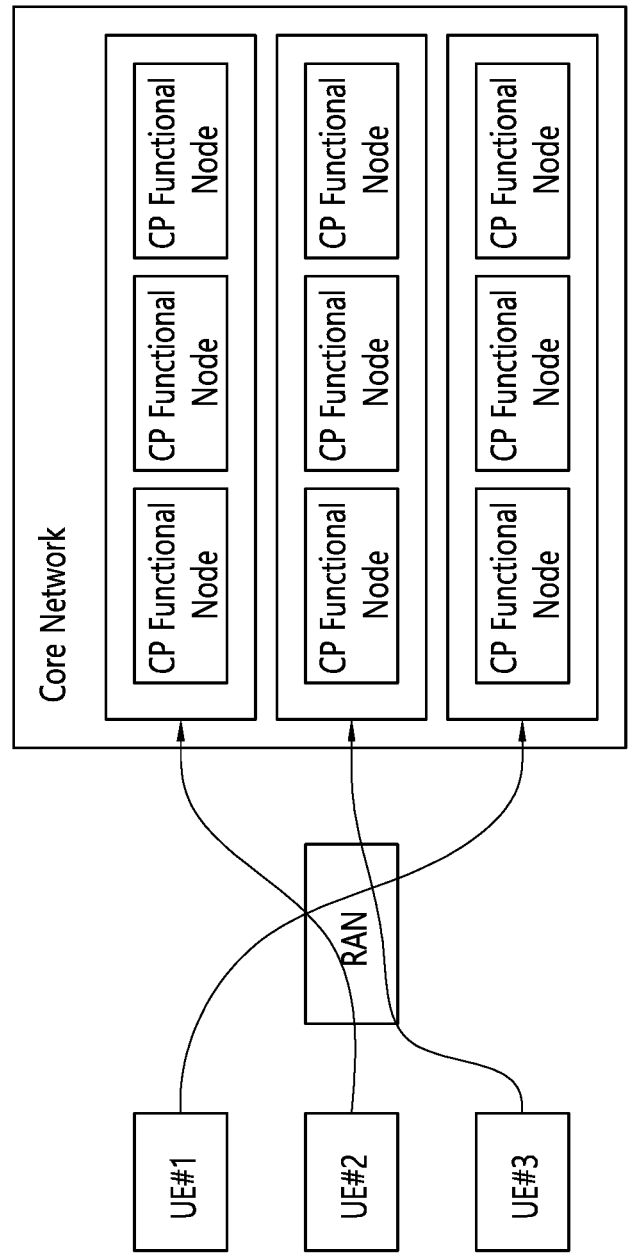
FIG. 4A is an exemplary diagram illustrating an example of an architecture for implementing the concept of network slicing.
Figure 4B:
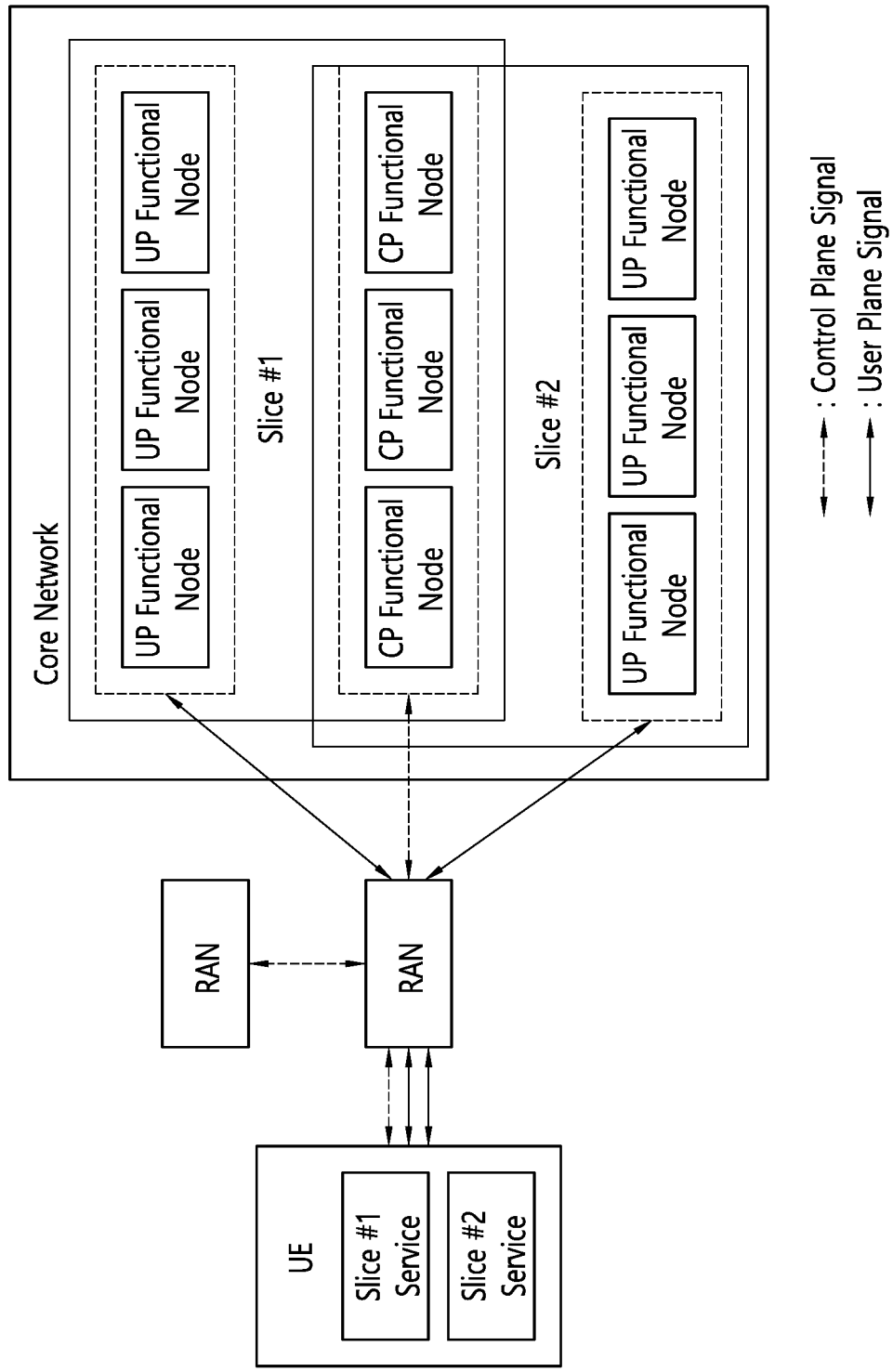
FIG. 4B is an exemplary view showing another example of an architecture for implementing the concept of network slicing.
Figure 5A:
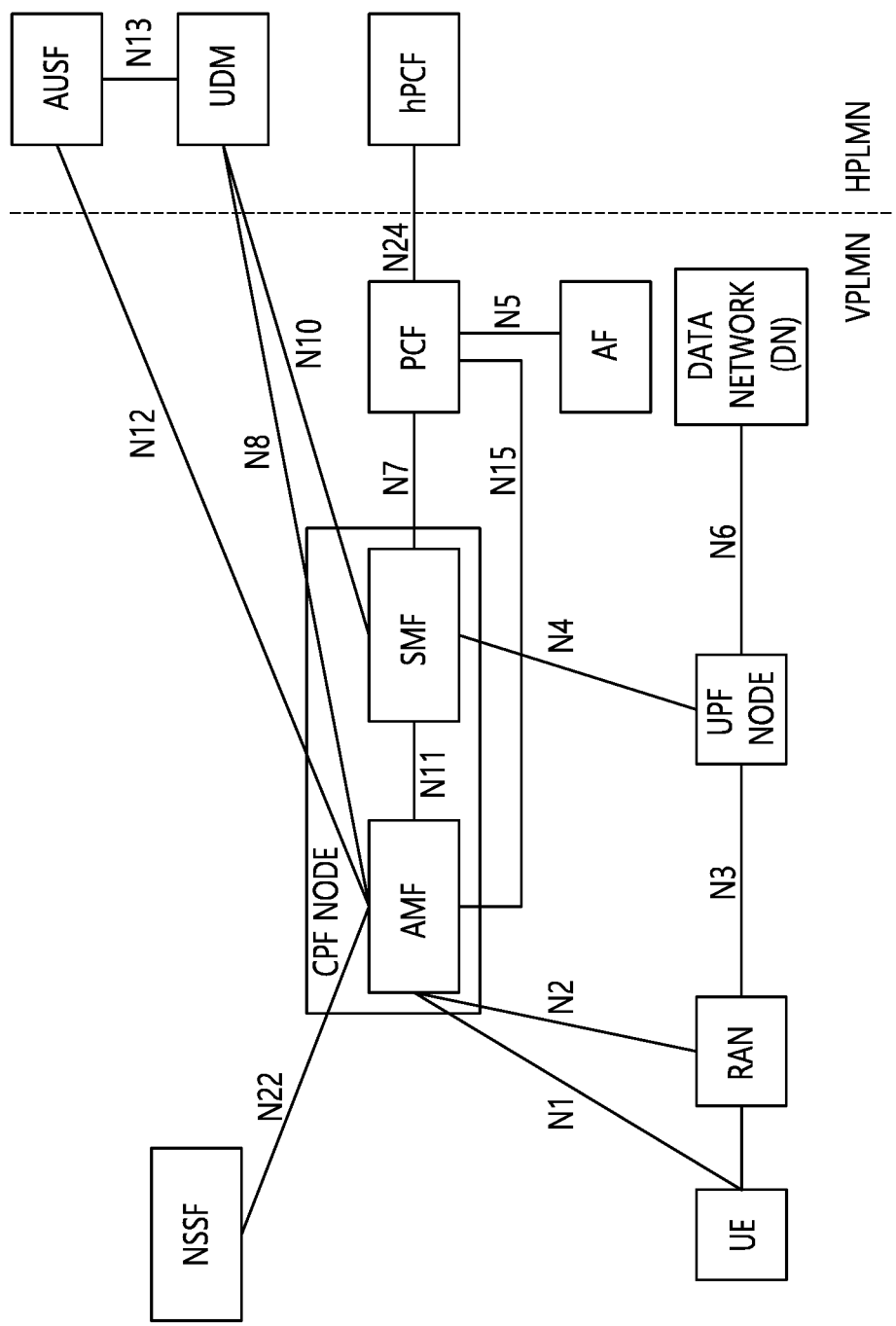
FIG. 5A is a diagram illustrating an example of architecture to which a local breakout (LBO) method is applied during roaming.
Figure 5B:
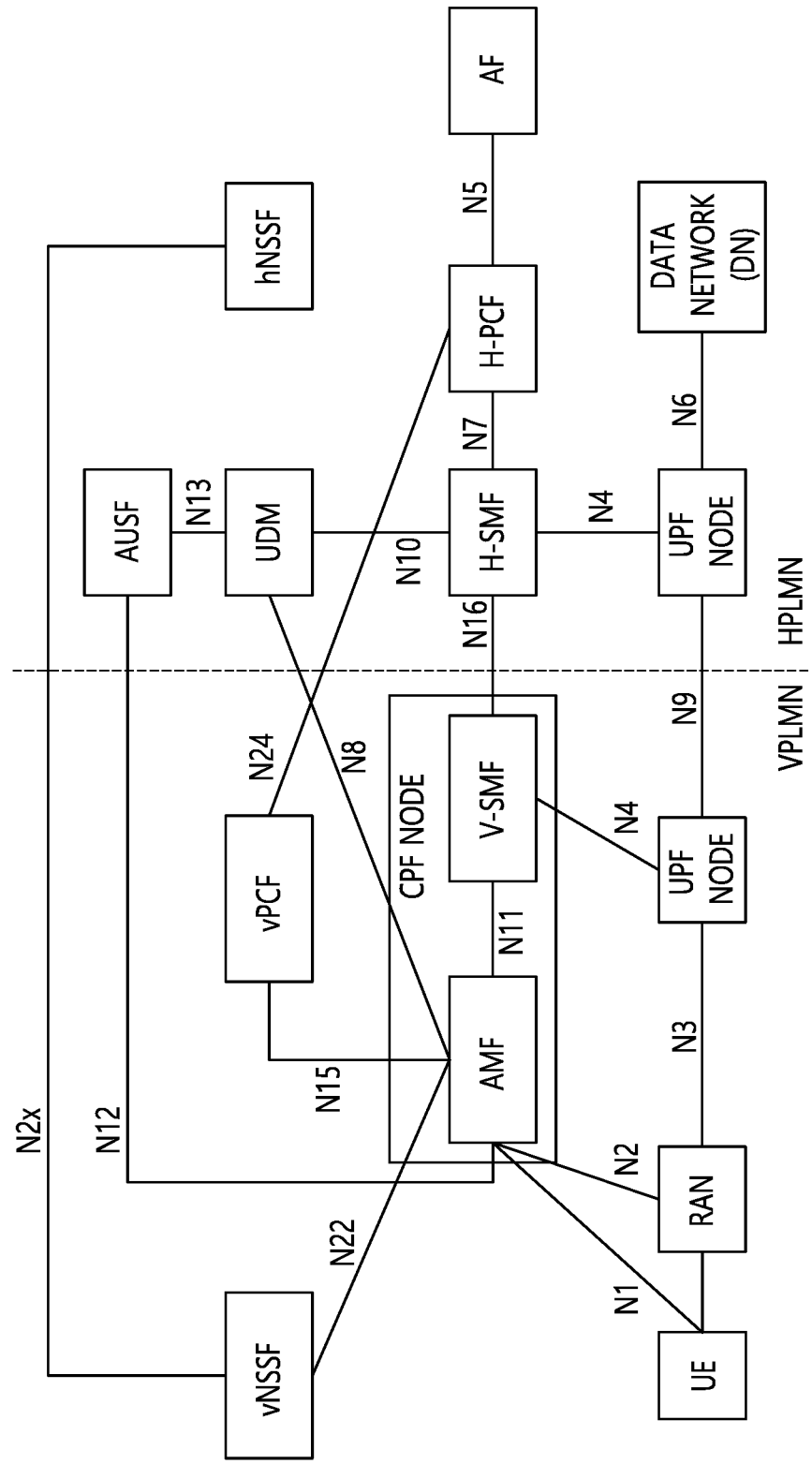
FIG. 5B is a diagram illustrating an example of architecture to which a home routed (HR) method is applied during roaming.
Figure 6A:
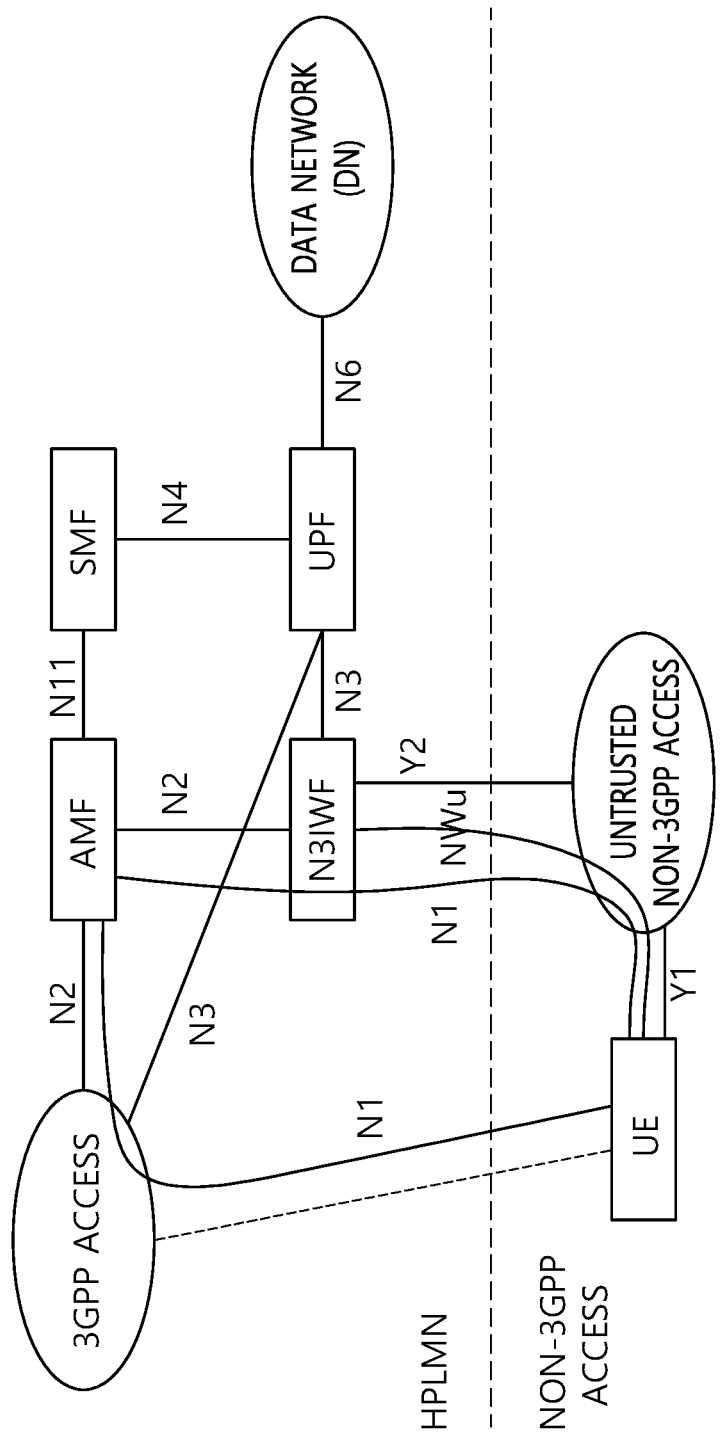
FIGS. 6A to 6F illustrate architectures for offloading data to a non-3GPP network.
Figure 6B:
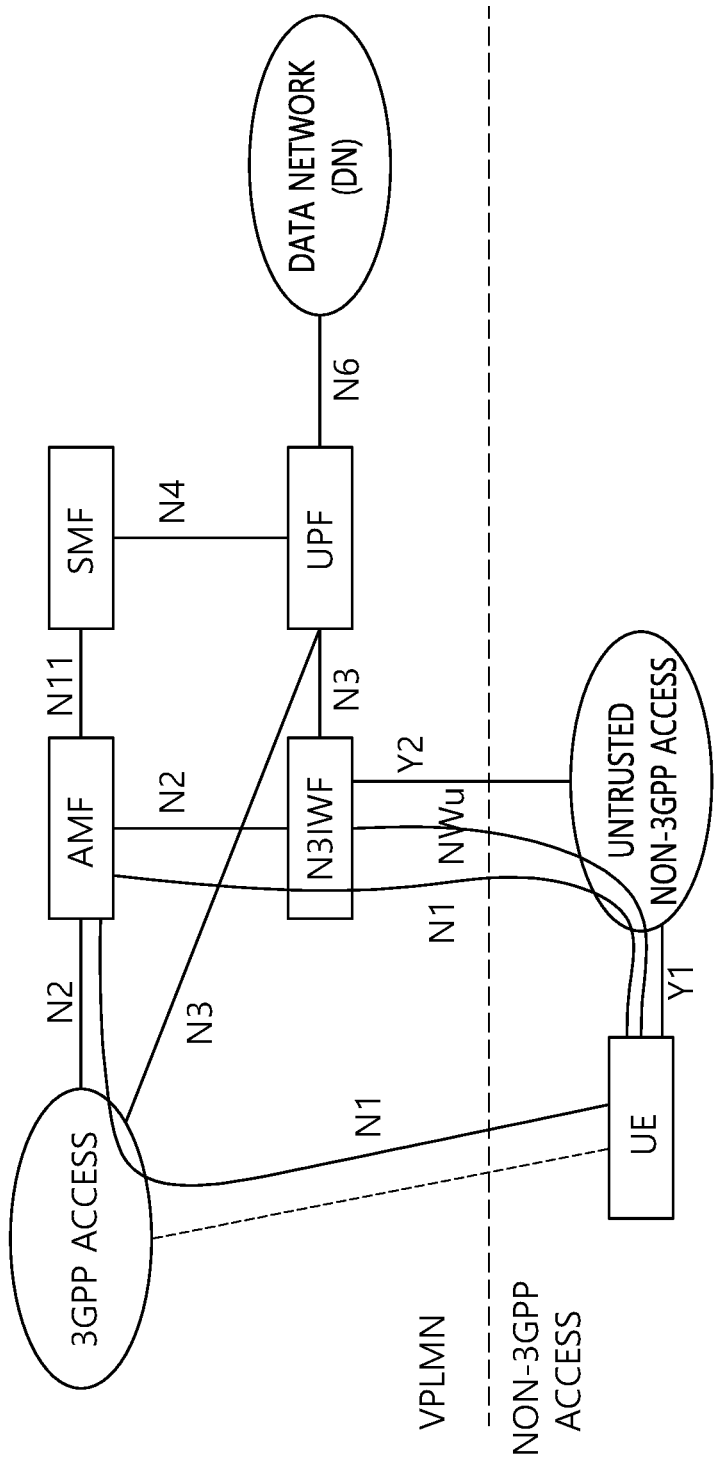
Figure 6C:
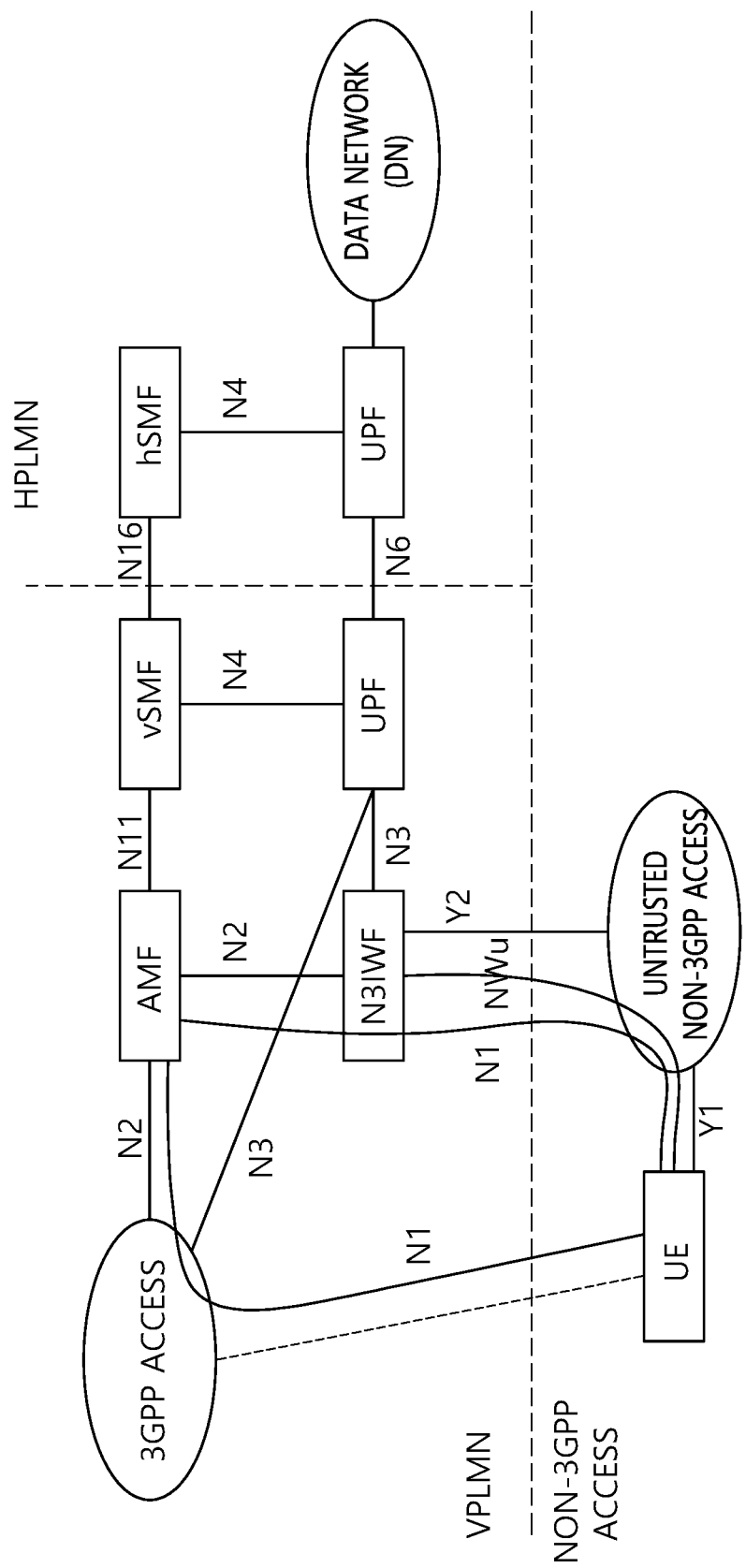
Figure 6D:
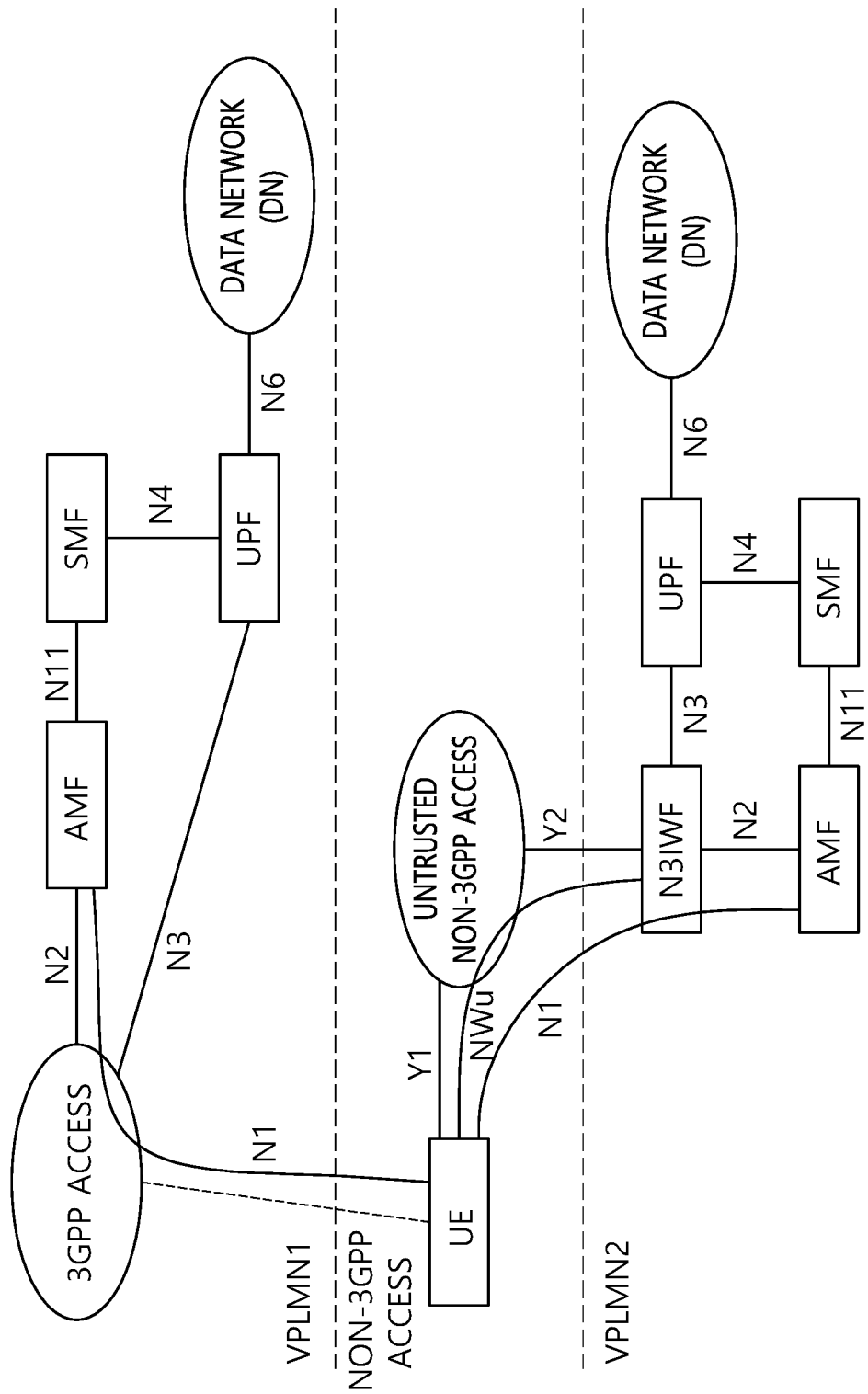
Figure 6E:
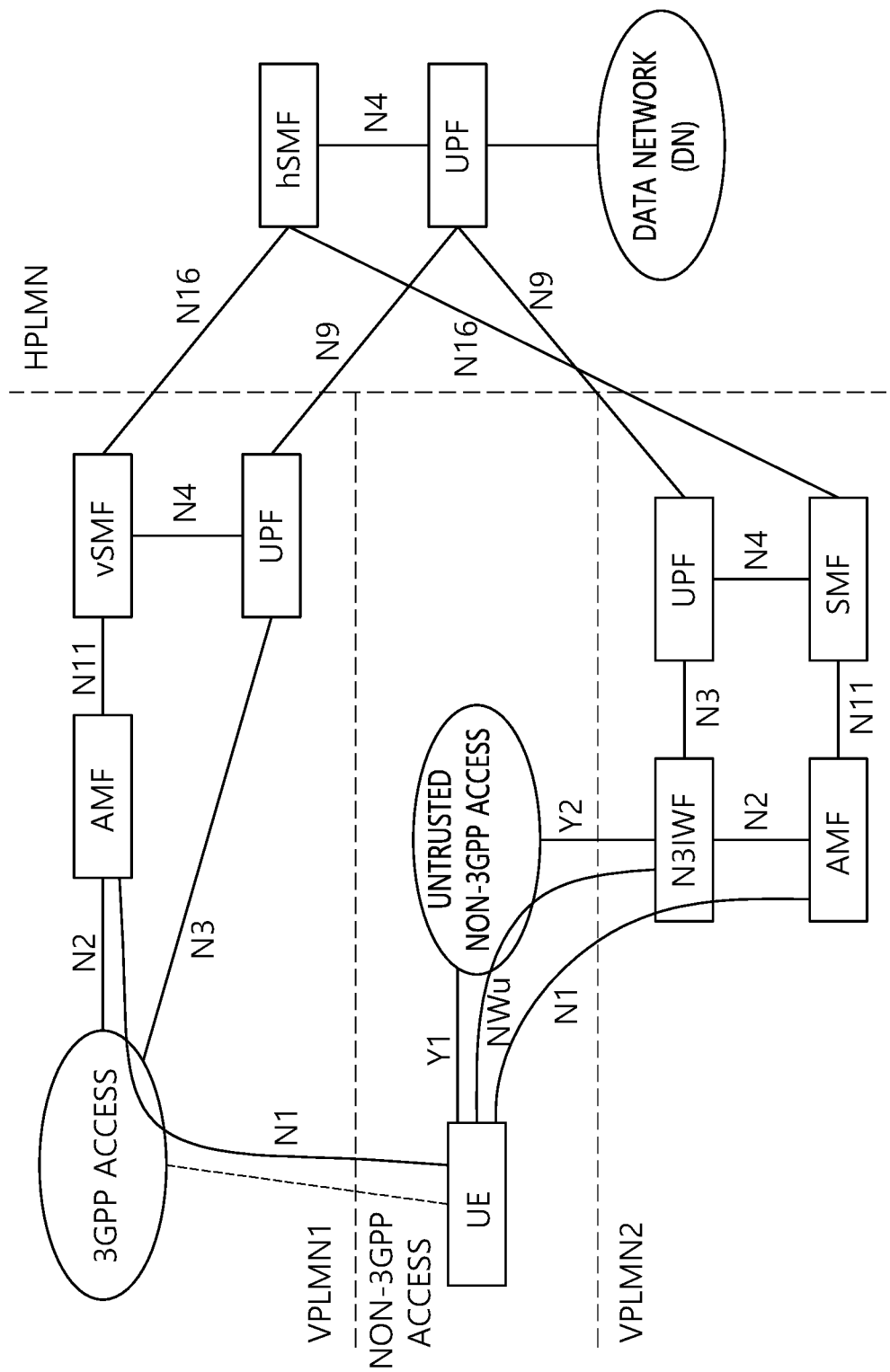
Figure 6F:
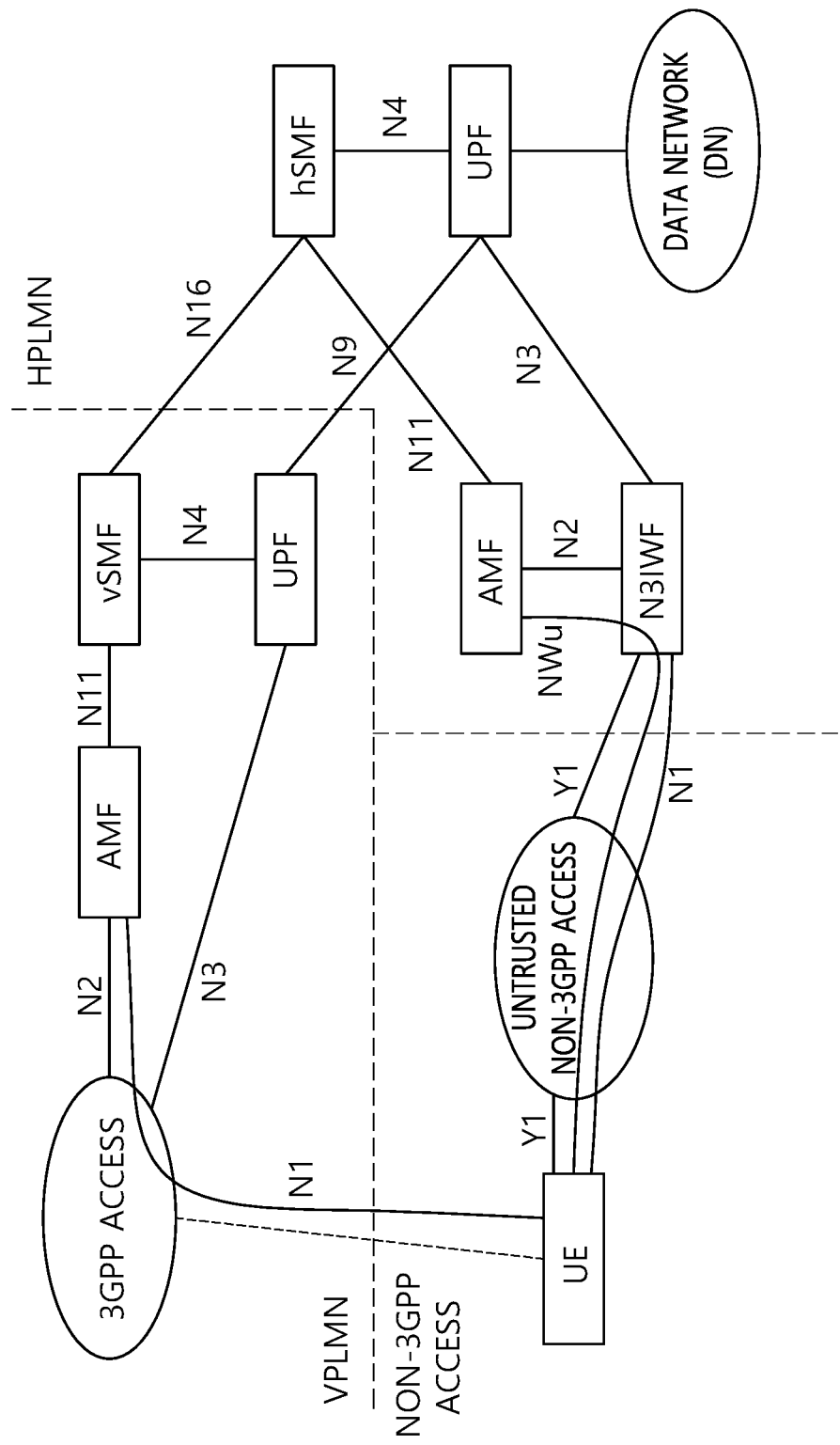

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

<Session and Service Continuity>

A new mobile communication network provides various modes to support session and service continuity (SSC).

1) SSC Mode 1

In a protocol data unit (PDU) session establishing process, a UPF operating as a PDU session anchor is maintained regardless of an access technology (that is, an access type and a cell). In the case of an IP-type PDU session, IP continuity is maintained regardless of movement of a UE. SSC Mode 1 may be applied to any PDU session type and also applied to any access type.

2) SSC Mode 2

If a PDU session has a single PDU session anchor, a network may trigger release of the PDU session and instruct a UE to establish the same PDU session. In the new PDU session establishing process, a UE operating as the PDU session anchor may be newly selected. SSC Mode 2 may be applied to any PDU session type and also applied to any access type.

3) SSC Mode 3

In regard to a PDU session for SSC Mode 3, before releasing connectivity between a UE and a previous PDU session anchor, a network may allow connectivity establishment of a UE using a new PDU session with respect to the same data network. If a trigger condition is applied, the network may determine whether to select an appropriate PDU session anchor for the new condition, that is, a UPF. SSC Mode 3 may be applied to any PDU session type and also applied to any access type.

4) SSC Mode Selection

In order to determine a type of SSC mode regarding an application of a UE or an application group of the UE, an SSC mode selection policy may be used.

An operator may provide the UE with the SSC mode selection policy. The policy may include one or more SSC mode selection policy rules.

<Multi-Access (MA) PDU Session>

An MA-PDU session may be generated by bundling together two separate PDU sessions each established to a different access.

Figure 7:
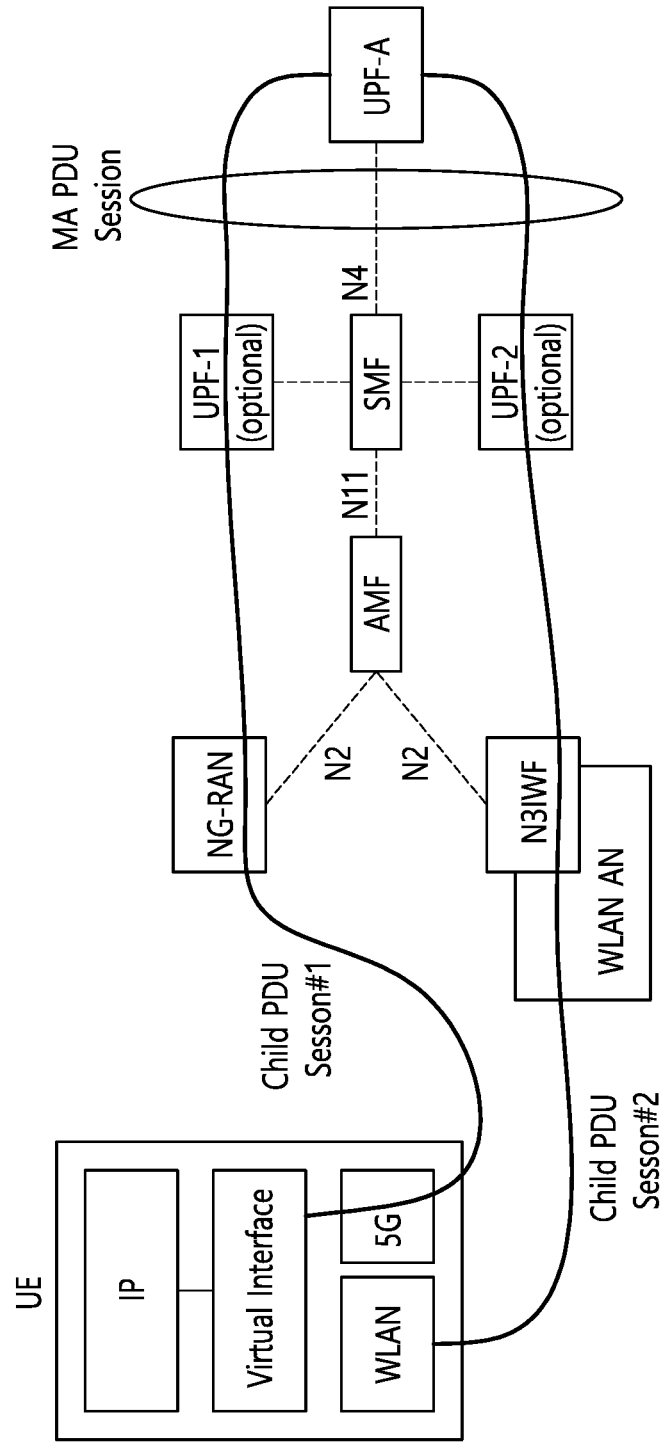
FIG. 7 shows an exemplary generation of an MA PDU session.

FIG. 7 shows an exemplary generation of an MA PDU session.

Figure 8:
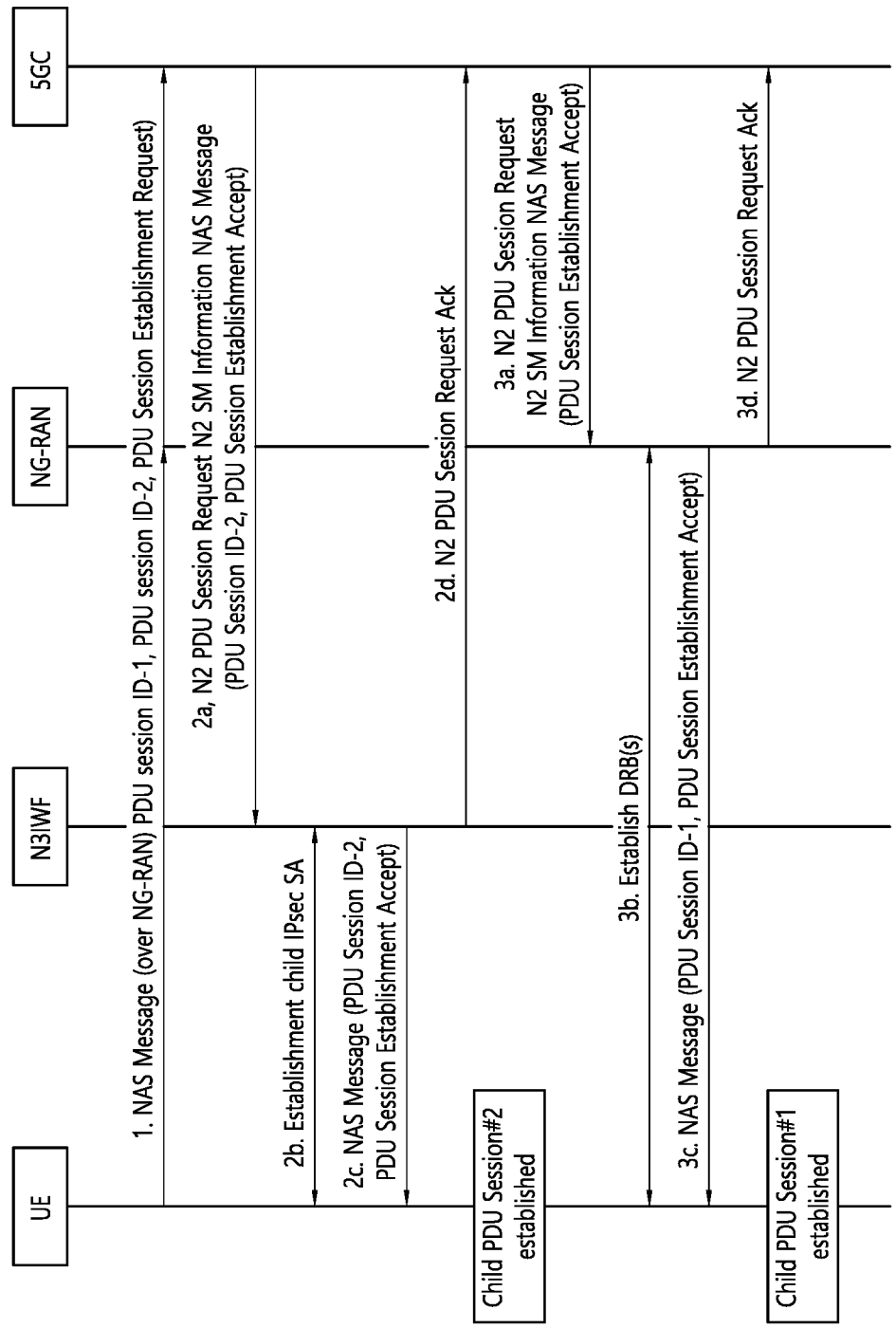
FIG. 8 is an exemplary diagram showing an exemplary combined establishment procedure of an MA-PDU session.

An MA-PDU session includes at least 2 PDU sessions represented as child PDU sessions in FIG. 8. Among the 2 PDU sessions, one PDU session established on a 3GPP access, and another PDU session is established on an untrusted non-3GPP access (e.g., WLAN AN).

In the MA-PDU session, the child PDU sessions may share the following characteristics:
(i) a common DNN;
(ii) a common UPF anchor (UPF-A);
(iii) a common PDU type (e.g., IPv6);
(iv) common IP address(es);
(v) a common SSC mode; and
(vi) a common S-NSSAI.

An MA-PDU session enables a multi-path data link between a UE and a UPF-A. This may be implemented below an IP layer.

An MA-PDU session may be established through one of the following procedures.

(i) The MA-PDU session may be established with 2 individual PDU session establishment procedures. This is referred to as a separate establishment.

(ii) The MA-PDU session may be established with one MA-PDU session establishment procedure. That is, 2 child PDU sessions are established simultaneously. This is referred to as a combined establishment.

Child PDU sessions may have the same IP address.

After an MA-PDU session is established, Session Management (SM) signaling that is related to the MA-PDU session may be transmitted/received through a random access.

A. Separate establishment of an MA-PDU session.

2 child PDU sessions may be established through 2 separate PDU session establishment procedures. For example, a UE may establish a first PDU session over a 3GPP access, and may subsequently establish a second PDU session over a non-3GPP access. The aforementioned 2 PDU sessions may be linked together, and, accordingly, the 2 PDU sessions may become the child PDU sessions of an MA-PDU session.

A linked PDU session may be provided to a 5G Core network (5GC). The 5GC links the second PDU session to the "linked" PDU session, and the 2 PDU sessions are designated as the child PDU sessions of the MA-PDU session.

Since the "linked" PDU session is provided to the 5GC, the UE no longer needs to request specific values for the DNN, S-NSSAI, SSC Mode, PDU type, and so on. The second PDU session may use the values of the "linked" PDU session without any modification.

A Request Type included in an Establishment Request message for the establishment of the second PDU session may be configured as an "Initial Request". If the 5GC receives a PDU Session Establishment Request message with a "linked" PDU session and a Request Type="Initial Request" setting, the 5GC interprets that the received request is for MA-PDU session establishment and, then, links the requested PDU session to an existing "linked" PDU session. Alternatively, if the "Initial Request" is not appropriate as the Request Type, a new request type may be used.

B. Combined Establishment 2 child PDU sessions may be established with a single procedure at the same time. This single procedure may be referred to as a UE-Requested MA-PDU Session Establishment procedure. If the UE intends to perform an MA-PDU session establishment while the UE is in a state of already being registered via two accesses, this procedure may be useful. Instead of performing two separate PDU Session Establishment procedures, by performing a single MA-PDU Session Establishment procedure, the UE may establish two child PDU sessions.

FIG. 8 is an exemplary diagram showing an exemplary combined establishment procedure of an MA-PDU session.

The combined establishment procedure shown in FIG. 8 represents a UE-requested MA-PDU session establishment procedure. Two child PDU session establishment procedures each has a different PDU Session ID. A child PDU session over a 3GPP access may be indicated with PDU Session ID-1, and a child PDU session over a non-3GPP access may be indicated with PDU Session ID-2. An SMF of the 5GC triggers two N2 PDU session establishment procedures. The UE may receive a PDU Session Establishment Accept message for PDU Session ID-1 via 3GPP access, and the UE may receive a PDU Session Establishment Accept message for PDU Session ID-2 via non-3GPP access. The SMF may perform anchoring of both of the two PDU sessions passing through the same UPF and may allocate a same IP address to the two PDU sessions.

Figure 9A:
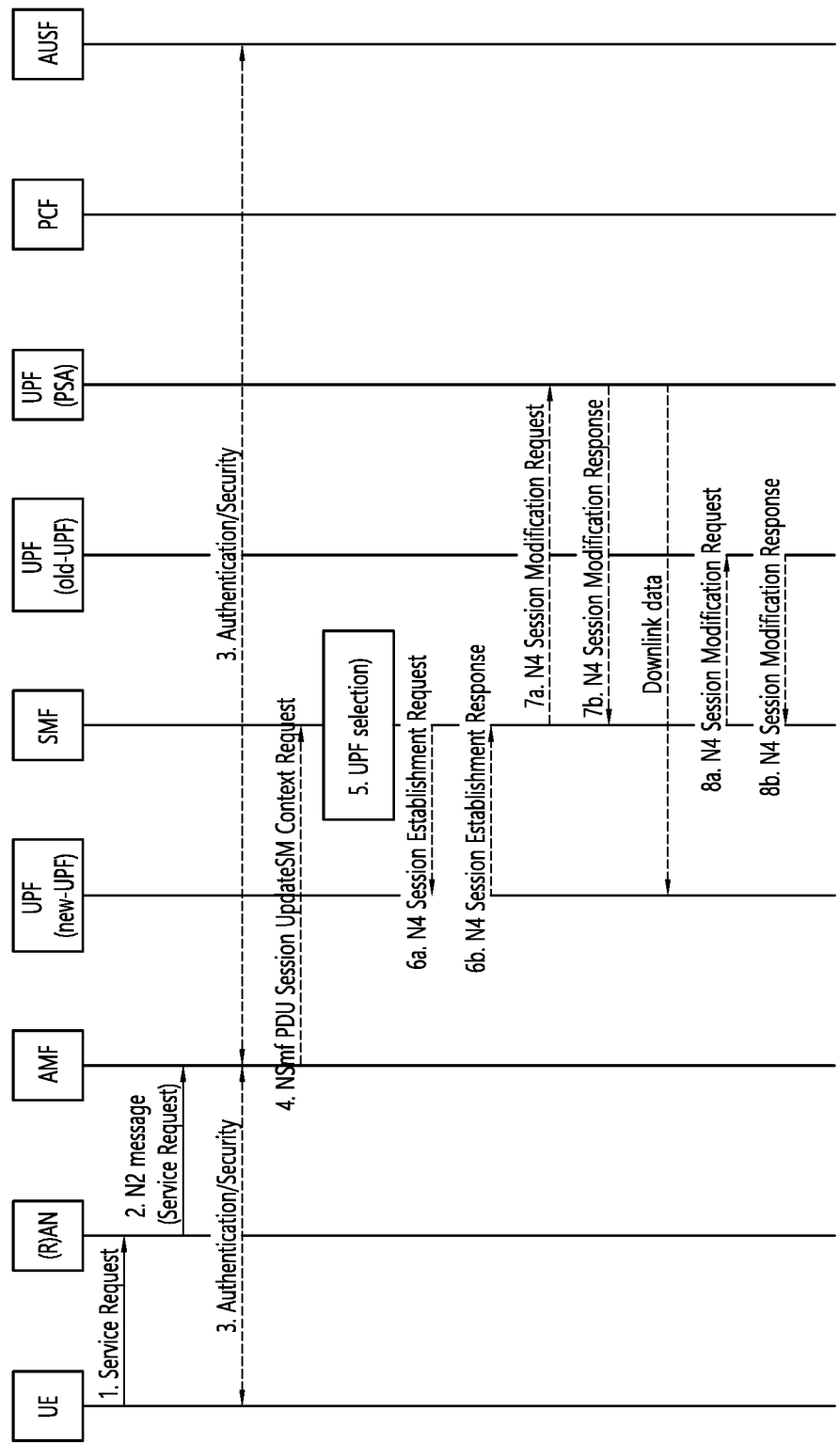
Figure 9B:
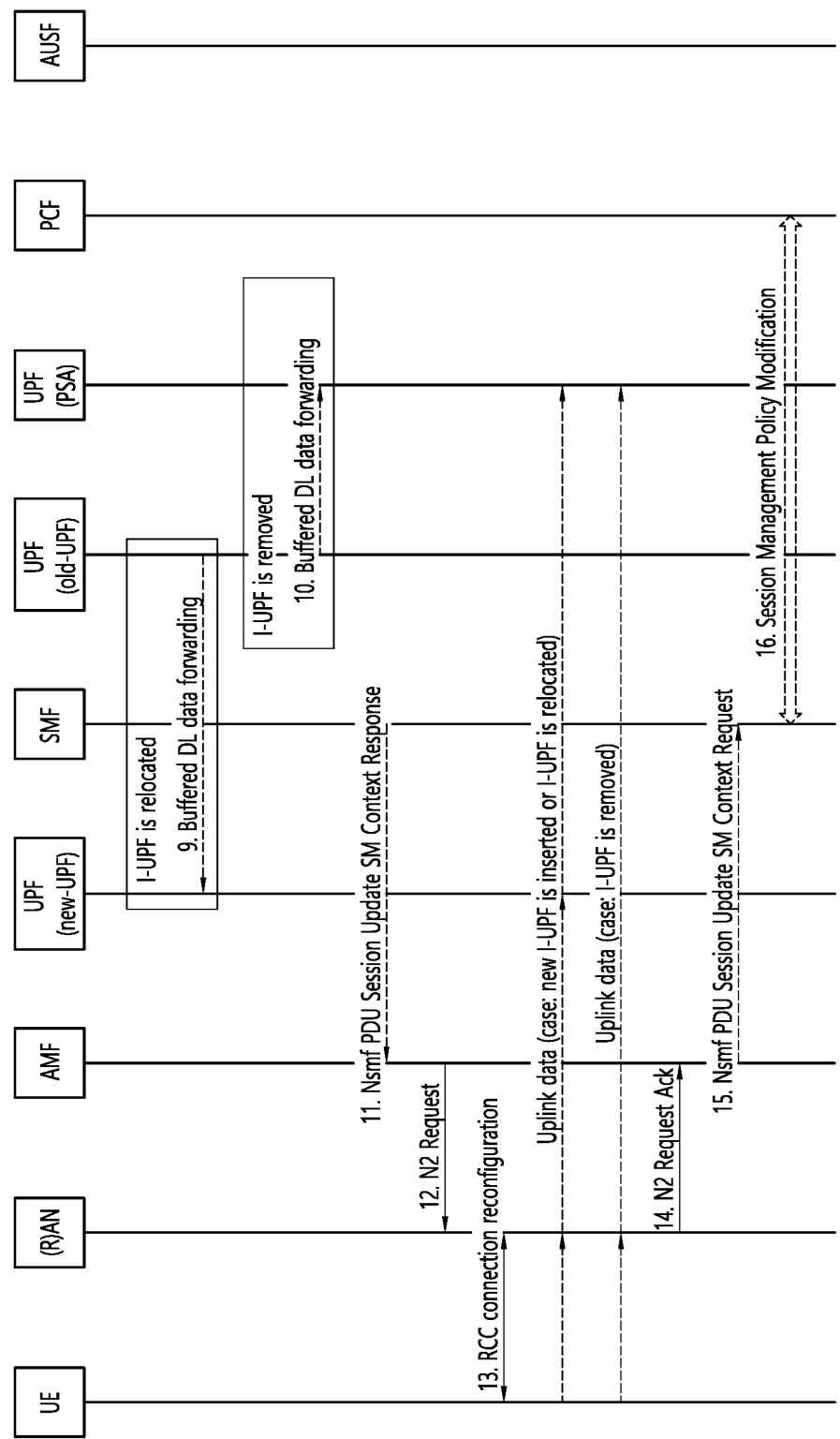

FIG. 9a to FIG. 9c show a UE-Triggered Service Request procedure.

Referring to FIG. 9a to FIG. 9c, a UE-Triggered Service Request procedure may be performed according to the following steps.

Step 1: A UE may transmit an AN message to a (R)AN. The AN message may include an AN parameter, a Service Request, and so on. The Service Request may include a List Of PDU Sessions To Be Activated, a List Of Allowed PDU Sessions, security parameters, and a PDU Session status.

Step 2: The (R)AN may transmit an N2 message to an AMF. The N2 message may include an N2 parameter and a Service Request.

Step 3: If a Service Request is transmitted without having its integrity protected, or if integrity protection authentication has failed, the AMF may initiate an NAS authentication/security procedure.

Step 4: (conditional) The AMF may transmit a Nsmf_PDUSession_UpdateSMContext Request to an SMF. The Nsmf_PDUSession_UpdateSMContext Request may include PDU Session ID(s), Operation Type, UE location information, and Access Type.

Step 5: If a PDU Session ID corresponds to an LADN, and if the SMF determines, based on a UE location change notification received from the AMF, that the UE is located outside of an available area of the LADN, the SMF may determine one of the following (based on local policies):
- to keep (or store) the PDU session, to reject activation of a user plane connection for the PDU session, and to notify the keeping and rejection to the AMF; or
- to release the PDU session and to notify the release of the PDU session to the AMF.

Step 6a: (conditional) The SMF transmits an N4 Session Establishment Request to a new UPF.

Step 6b: (conditional) The new UPF transmits an N4 Session Establishment Response to the SMF.

Step 7a: (conditional) The SMF transmits an N4 Session Modification Request to the UPF.

Step 7b: The UPF(PSA) transmits an N4 Session Modification Response message to the SMF.

Step 8a: (conditional) The SMF transmits an N4 Session Modification Request to the old UPF. The N4 Session Modification Request may include New UPF address, and New UPF DL Tunnel ID.

Step 8b: The old UPF may transmit an N4 Session Modification Response to the SMF.

Step 9: (conditional) The old UPF(intermediate) may forward (or deliver) buffered downlink data to the new UPF(intermediate). If an I-UPF is changed, and if a forwarding tunnel is configured to anew I-UPF, the old I-UPF forwards the buffered data to the new I-UPF, which acts as an N3 terminating point.

Step 10: (conditional) The old UPF(intermediate) forwards buffered downlink data to the UPF(PSA). If the old I-UPF is removed, a new I-UPF is not allocated for the PDU session, and a forwarding tunnel is configured to the UPF (PSA), the old I-UPF forwards the buffered data to the UPF(PSA), which acts as an N3 terminating point.

Step 11: (conditional) The SMF may transmit an Nsmf_PDUSession_UpdateSMContext Response to the AMF. The Nsmf_PDUSession_UpdateSMContext Response may include N2 SM information (PDU Session ID, QFI(s), QoS profile(s), CN N3 Tunnel Info, S-NSSAI, User Plane Security Enforcement), and Cause.

If the UPF being connected to the RAN is UPF(PSA), CN N3 Tunnel Info may be UL Tunnel Info of the UPF(PSA). If the UPF being connected to the RAN is a new I-UPF, the CN N3 Tunnel Info may be UL Tunnel Info of an intermediate UPF.

Step 12: The AMF transmits an N2 Request to the (R)AN. The N2 Request may include N2 SM information received from SMF, security context, AMF Signaling Connection ID, Handover Restriction List, Subscribed UE-AMBR, MM NAS Service Accept, and list of recommended cells/TAs/NG-RAN node identifiers.

Step 13: The NG-RAN performs RRC Connection Reconfiguration for a UE in accordance with all QoS flows of a PDU session having its UP connection activated and QoS information for Data Radio Bearers.

Step 14: (conditional) The (R)AN may transmit an N2 Request Ack to the AMF. The N2 Request Ack may include AN Tunnel Info, a List of accepted QoS Flows for the PDU Sessions whose UP connections are activated, a List of rejected QoS Flows for the PDU Sessions whose UP connections are activated, and PDU Session ID.

Step 15: (conditional) The AMF may transmit an Nsmf_PDUSession_UpdateSMContext Request per PDU session to the SMF. The Nsmf_PDUSession_UpdateSMContext Request may include N2 SM information, and RAT Type.

Step 16: (optional) If dynamic PCC is deployed, the SMF may initiate a notification for a new location information for the PCF by performing a Session Management Policy Modification procedure. The PCF may provide updated policies.

Step 17a: (conditional) The SMF may transmit an N4 Session Modification Request to a new intermediate (I)-UPF. The N4 Session Modification Request may include AN Tunnel Info, and a List of accepted QFI(s).

Step 17b: (conditional) The UPF may transmit an N4 Session Modification Response to the SMF.

Step 18a: (conditional) The SMF may transmit an N4 Session Modification Request to the UPF(PSA). The N4 Session Modification Request may include AN Tunnel Info, and a List of rejected QoS Flows.

Step 18b: (conditional) The UPF may transmit an N4 Session Modification Response to the SMF.

Step 19: (conditional) The SMF may transmit an Nsmf_PDUSession_UpdateSMContext Response to the AMF.

Step 20a: (conditional) The SMF may transmit an N4 Session Modification Request to a new UPF(intermediate).

Step 20b: (conditional) The SMF may transmit an N4 Session modification response to the new UPF(intermediate).

Step 21a: (conditional) The SMF may transmit an N4 Session Modification Request to the UPF(PSA).

Step 21b: (conditional) The UPF(PSA) may transmit an N4 Session Modification Response to the SMF.

Step 22a: (conditional) The SMF may transmit an N4 Session Modification Request or N4 Session Release Request to the old UPF.

Step 22b: The old UPF(intermediate) may transmit an N4 Session Modification Response or N4 Session Release Response to the SMF.

Figure 10:
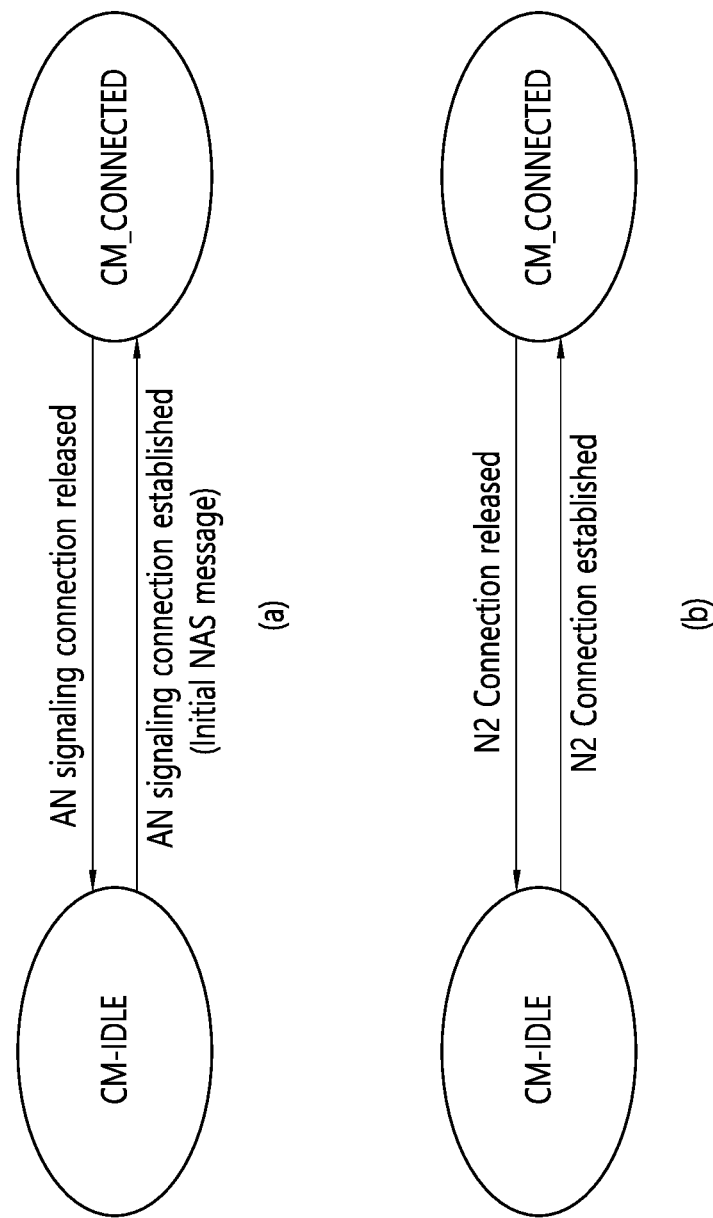
FIG. 10 shows a Connection Management Status model in a wireless communication system.

FIG. 10 shows a Connection Management Status model in a wireless communication system.

Connection Management (CM) is used for establishing and releasing a signaling connection between a UE and an AMF. The CM includes functions of establishing and releasing a signaling connection between a UE and an AMF via N1. The signaling connection is used for enabling an NAS signaling exchange between a UE and a core network. The signaling connection includes both an AN signaling connection for a UE between a UE and an AN, and an N2 connection for a UE between an AN and an AMF.

Referring to FIG. 10, in order to reflect the NAS signaling connection for the UE with the AMF, two types of CM status, CM-IDLE and CM-CONNECTED, may be used. (a) of FIG. 10 shows a CM status transition within the UE, and (b) of FIG. 10 shows a CM status transition within the AMF.

A UE in the CM-IDLE state is in an RM-REGISTERED state and does not have an NAS signaling connection, which is established with the AMF via N1. The UE performs cell selection, cell re-selection, and PLMN selection. AN signaling connection, N2 connection, and N3 connection for a UE in the CM-IDLE state do not exist.

In the CM-IDLE state, if the UE is not in a MICO mode, the UE responds to a paging (if received) by performing a Service Request procedure. Alternatively, when the UE has uplink signaling to be transmitted or user data, the UE performs a Service Request procedure. Alternatively, each time an AN signaling connection is established between a UE and an AN, the UE enters the CM-CONNECTED state. Alternatively, a transmission of an Initial NAS message (Registration Request, Service Request, or Deregistration Request) initiates a transition to the CM-CONNECTED state from the CM-IDLE state.

In the CM-IDLE state, if the UE is not in a MICO mode, when the AMF has signaling to be transmitted to the UE or mobile-terminated data, by transmitting a Paging Request to the corresponding UE, the AMF performs a Network-Triggered Service Request procedure. Each time an N2 connection for the corresponding UE between an AN and the AMF is established, the AMF enters the CM-CONNECTED state.

The UE in the CM-CONNECTED state has an NAS signaling connection with the AMF via N1. In the CM-CONNECTED state, each time an AN signaling connection is released, the UE enters the CM-IDLE state.

In the CM-CONNECTED state, each time an N2 signaling connection and an N3 signaling connection for a UE is released, the AMF enters the CM-IDLE state.

When the NAS signaling procedure is completed, the AMF may determine a release of the NAS signaling connection of the UE. When an AN signaling connection release is completed, the UE in the CM state is changed (or shifted) to CM-IDLE. When an N2 Context Release procedure is completed, the CM status for the UE within the AMF is changed (or shifted) to CM-IDLE.

The AMF may maintain the UE in the CM-CONNECTED state until the UE is de-registered from the core network. The UE being in the CM-CONNECTED state may be in an RRC Inactive state.

When the UE is in the RRC Inactive state, UE reachability is managed by a RAN by using supplementary information from the core network. Additionally, when the UE is in the RRC Inactive state, UE paging is managed by the RAN. Additionally, when the UE is in the RRC Inactive state, the UE monitors paging by using a CN and RAN identifier of the UE. The RRC Inactive state is applied to NG-RAN (i.e., the RRC Inactive state is applied to an NR and E-UTRA being connection to a 5G CN). Based on the network settings, in order to supplement the NG-RAN for determining whether or not to transition (or shift) the UE to the RRC Inactive state, the AMF provides supplementary information to the NG-RAN. RRC Inactive supplementary information includes UE-specific DRX value for RAN paging, while in the RRC Inactive state, and a registration area being provided to the UE.

CN supplementary information is provided to a serving NG RAN node during N2 activation (i.e., during registration, service request, path switch).

Statuses of N2 and N3 reference points are not changed (or shifted) by a UE entering the CM-CONNECTED state being accompanied by the RRC Inactive state. The UE being in the RRC Inactive state knows the RAN notification area. When the UE is in the CM-CONNECTED state being accompanied by the RRC Inactive state, the UE may resume the RRC connection via uplink data pending, Mobile-initiated signaling procedure (i.e., periodic registration update), response to RAN paging, or notification, to the network, of the UE's deviation from the RAN notification area to the network.

If the UE resumes connection from different NG-RAN nodes within the same PLMN, a UE AS context is retrieved from the old NG-RAN, and the procedure is triggered toward the CN.

When the UE is in the CM-CONNECTED state being accompanied by the RRC Inactive state, the UE performs cell selection using GERAN/UTRAN/EPS and follows an IDLE mode procedure. Additionally, the UE being in the CM-CONNECTED state being accompanied by the RRC Inactive state enters the CM-IDLE mode and follows the NAS procedure according to the cases listed below:

a case where the RRC Resume procedure is fails, or a case where shift of the UE to the CM-IDLE mode is requested, in a Failure scenario that cannot be resolved in the RRC Inactive mode.

NAS signaling connection management includes functions of establishing and releasing NAS signaling connection. A NAS Signaling Connection Establishment function is provided by the UE and the AMF in order to establish a NAS Signaling Connection of a UE being in the CM-IDLE state. When a UE being in the CM-IDLE state needs to transmit a NAS message, the UE initiates a Service Request or Registration procedure in order to establish a signaling connection to the AMF. Based on the UE's preference, UE subscription information, UE mobility pattern, and network settings, the AMF may maintain the NAS signaling connection until the UE is de-registered from the network.

The Deregistration procedure of the NAS signaling connection is initiated by the 5G (R)AN node or AMF. If the UE detects the deregistration of an AN signaling connection, the UE determines that the NAS signaling connection has been deregistered. If the AMF detects a deregistration of an N2 context, the AMF determines that the NAS signaling connection has been deregistered.

<Disclosure of this Specification>

In a 5G system, if a 3GPP access network (e.g., 5G) and a non-3GPP access network (e.g., WIFI) are connected to a same Public Land Mobile Network (PLMN), a UE may receive a service from a same AMF (or AMF node). As Mobility Management and Session Management, which are adopted in the 5G system, are each designed as an independent function, only the AMF manages the UE's state, and the SMF (or SMF node) operates without knowing whether the UE is in a connection-management (CM)-IDLE state or a CM-CONNECTED state. Therefore, if downlink data exist in a state where a user plane of a non-3GPP PDU session is in an inactive state, the SMF may transmit a message to the AMF so that the user plane can be activated.

If a UE in the CM-IDLE state for a non-3GPP access network, the UE may relocate (or transfer) a PDU session to a 3GPP access network. However, whether or not non-3GPP signaling can be transmitted via 3GPP network has not yet been determined, and the present disclosure proposes a method for transmitting an access network traffic steering, switching and splitting (ATSSS) rule to the UE, under an assumption that signaling for a non-3GPP PDU session can be transmitted through a 3GPP access network.

Meanwhile, as a rule for transmitting a specific data flow to a 3GPP access network or a non-3GPP access network, the ATSSS rule may be dynamically updated by a wireless condition of the network system or access network.

Generally, a rule related to traffic steering may be transmitted by an access network being influenced by rules. For example, if the ATSSS rule is for relocating (or transferring) traffic to a non-3GPP access network, the ATSSS rule may be transmitted through the non-3GPP access network receiving the traffic. By sending the ATSSS rule to an access network that intends to transmit traffic, usage availability of the corresponding access network may also be checked.

While transmitting the ATSSS rule, a Quality of Service (QoS) for transmitting traffic to a target access network may be updated. In order to perform QoS update for the target access network, N2 setup information may be transmitted along with ATSSS information. And, herein, if the target access network is in the CM-IDLE state, there may occur a case where the N2 setup information is transmitted to an access network that is not the target access network. In this case, a problem of performing unnecessary QoS update in an unwanted access network may occur.

Additionally, since the target access network is in the CM-IDLE state, if of transmitting a signal to another access network, a problem of failing to check the target access network may occur.

Therefore, in order to resolve the above-described problems, the present disclosure proposes a method for transmitting an ATSSS rule.

Figure 11:
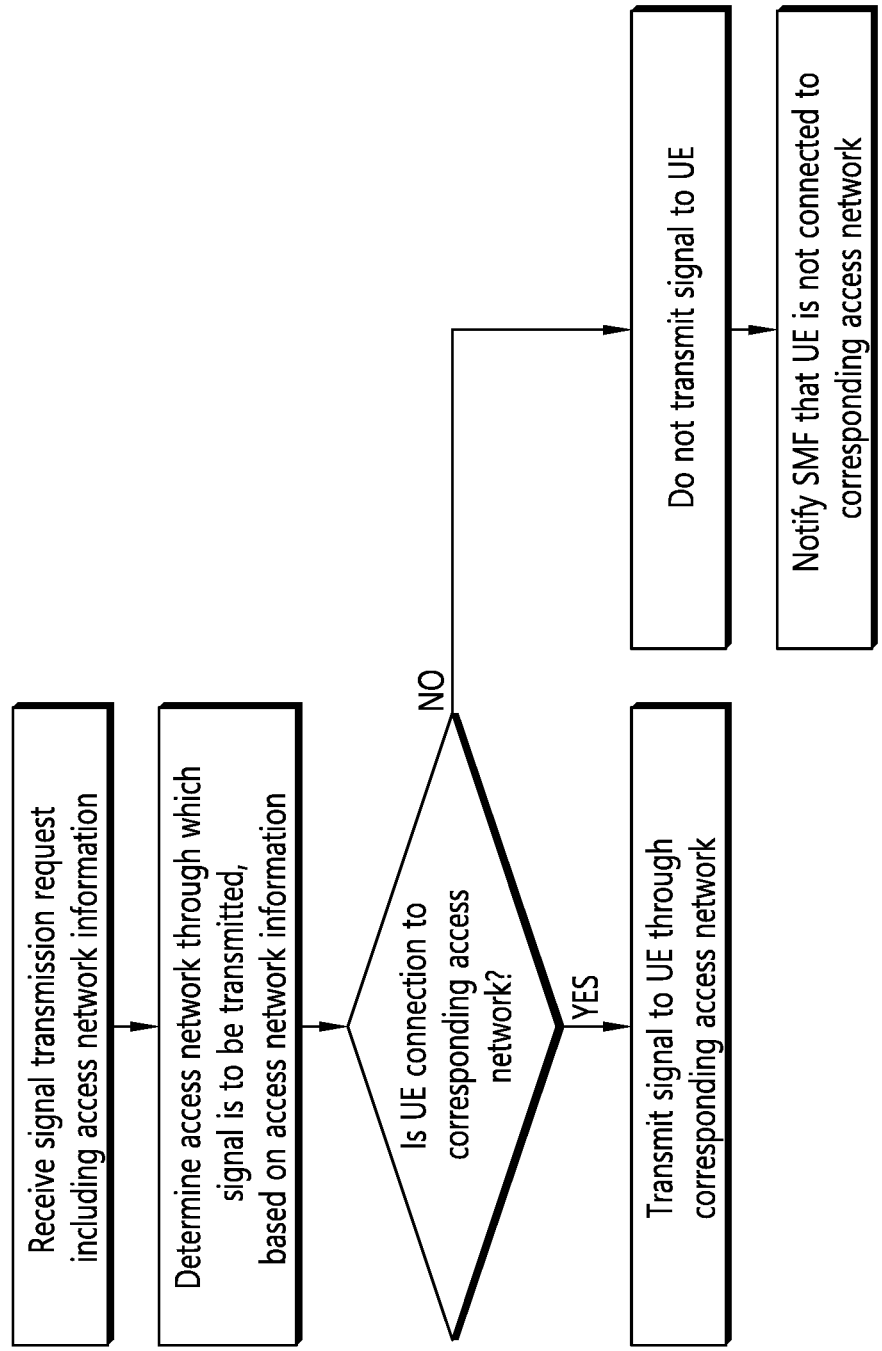
FIG. 11 shows operations of an AMF according to an embodiment of this specification.

FIG. 11 shows operations of an AMF according to an embodiment of this specification.

Referring to FIG. 11, when an SMF requests an AMF to transmit a signal to a UE, the request may include information indicating to which access network the requested signal shall be transmitted. The information may indicate one of the following:

transmit the PDU session only to an associated access network of the PDU session that is to be transmitted; or transmit the PDU session only to a specific access network (e.g., 3GPP, non-3GPP, or any access) regardless of its association or non-association with the PDU session that is to be transmitted.

If the SMF includes information indicating that an SM signal shall be transmitted only to an access network being associated with the PDU session or information indicating that an SM signal shall be transmitted only to a specific access network, the AMF may respond to the SMF based on the corresponding information without transmitting any paging or NAS notification. For example, if the SMF intends to transmit an SM signal for a PDU session being associated with a non-3GPP access, the SMF may request the AMF to perform transmission only to the associated access network or to perform transmission only to the non-3GPP access network. At this point, if the UE is in the CM-IDLE state for non-3GPP, the AMF does not transmit the SM signal to the UE and may notify to the SMF that the SM signal cannot be transmitted through the associated access network or the non-3GPP access network. Additionally, the AMF may notify to the SMF that the UE is in CM-IDLE for the non-3GPP access network.

While requesting for an SM signal transmission and a user plane activation at the same time, if the SMF requests for the SM signal to be transmitted to a specific access network or associated access network, the SMF may handle the user plane activation by using the same method as the SM signal. For example, when the transmission of an SM signal for a non-3GPP PDU session is to be performed simultaneously with the user plane activation, an if the SMF has requested for the SM signal to be transmitted through a non-3GPP access network or through an associated access network, the AMF may not perform user plane activation to a 3GPP access network or to a non-associated access network.

If the SMF does not specify an access network to which the SM signal is to be transmitted, or if the SMF has requested to perform transmission to any access network, the AMF may also transmit the signal to other access networks based on an operator policy, and so on.

If of a multi-access PDU session, the AMF may store the associated access as a multi-access or "both-access". While requesting transmission of a message corresponding to the multi-access PDU session to the associated access, if the SMF has not designated a specific access, or if the SMF has requested the transmission to be performed only to the associated access, the AMF may select a random access and may then transmit the message. According to the operator policy, the AMF may transmit the message by selecting an access network being in the CM-CONNECTED state, or by paging a 3GPP access network, at a higher priority, even if the access network is in the CM-IDLE state.

Figure 12:
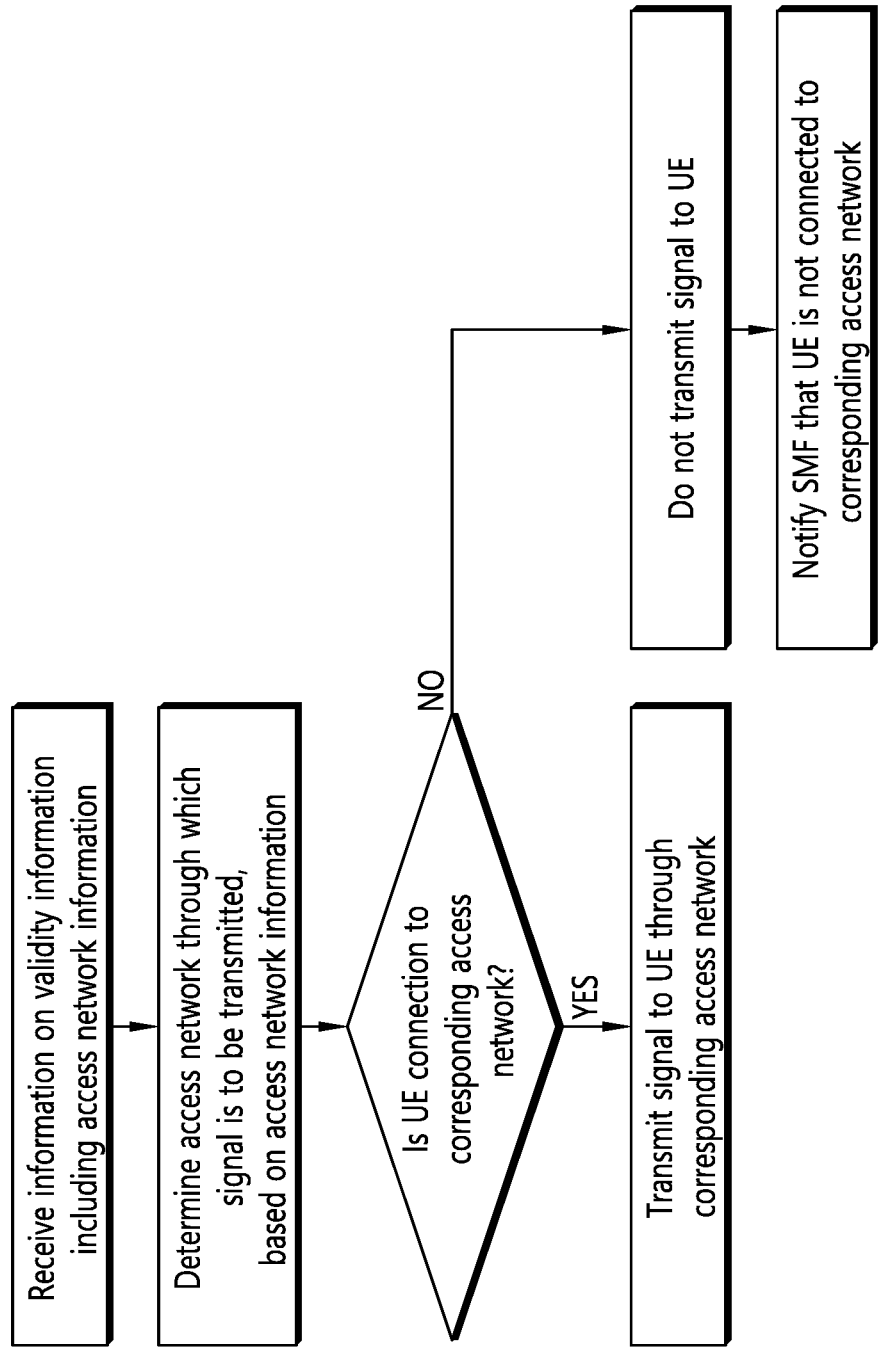
FIG. 12 shows operations of an AMF according to another embodiment of this specification.

FIG. 12 shows operations of an AMF according to another embodiment of this specification.

Referring to FIG. 12, an SMF may transmit information on a validity area to an AMF while requesting an N1N2MessageTransfer. Herein, the information on the validity area may indicate that the validity area is one of a 3GPP access network and a non-3GPP access network. The validity area may be configured through a tracking area (TA) list.

Although the AMF has transitioned the UE to a connected mode via paging, if the UE does not exist in the validity area, the AMF does not transmit N2 setup information, which is transmitted by the SMF, to a base station and may notify location information of the UE to the SMF. Based on the location information of the UE, the SMF may select a new intermediate UPF and may update a user plane path. Based on the updated information, the SMF may regenerate the N2 setup information and may transmit the regenerated information to the AMF. At this point, an N1 message may be transmitted to the UE after the UE is transitioned to a connected mode.

Information on the validity area may include information on an access network. When requesting the N1N2MessageTransfer, the SMF may transmit information on the validity area including the information on the access network. For example, if the validity area is configured as non-3GPP, the AMF shall transmit a message only through a non-3GPP access network. If it is impossible for the UE to perform message transmission due to its CM-IDLE state for the non-3GPP access network, the AMF shall notify to the SMF that the message transmission is impossible. At this point, the AMF shall not transmit the N2 message nor the N1 message.

As in UPF relocation, if only the message is not transmitted, the SMF may transmit, to the AMF, information on whether the validity area is applied to both N1 and N2 or whether the validity area is applied to only one of N1 and N2. The aforementioned information application and non-application may be included in the information on the validity information.

The SMF may differentiate N1 from N2 and may transmit the validity information accordingly. That is, a validity area for N1 and a validity area for N2 may be different.

If the validity area is not defined, the AMF may transmit a message through an associated access network. For example, if a PDU session is a multi-access PDU session, and if the validity area is not defined, according to the operator policy, the AMF may select an access network being in the CM-CONNECTED state, or may transmit a message by paging a 3GPP access network, at a higher priority, even if the access network is in the CM-IDLE state.

Figure 13:
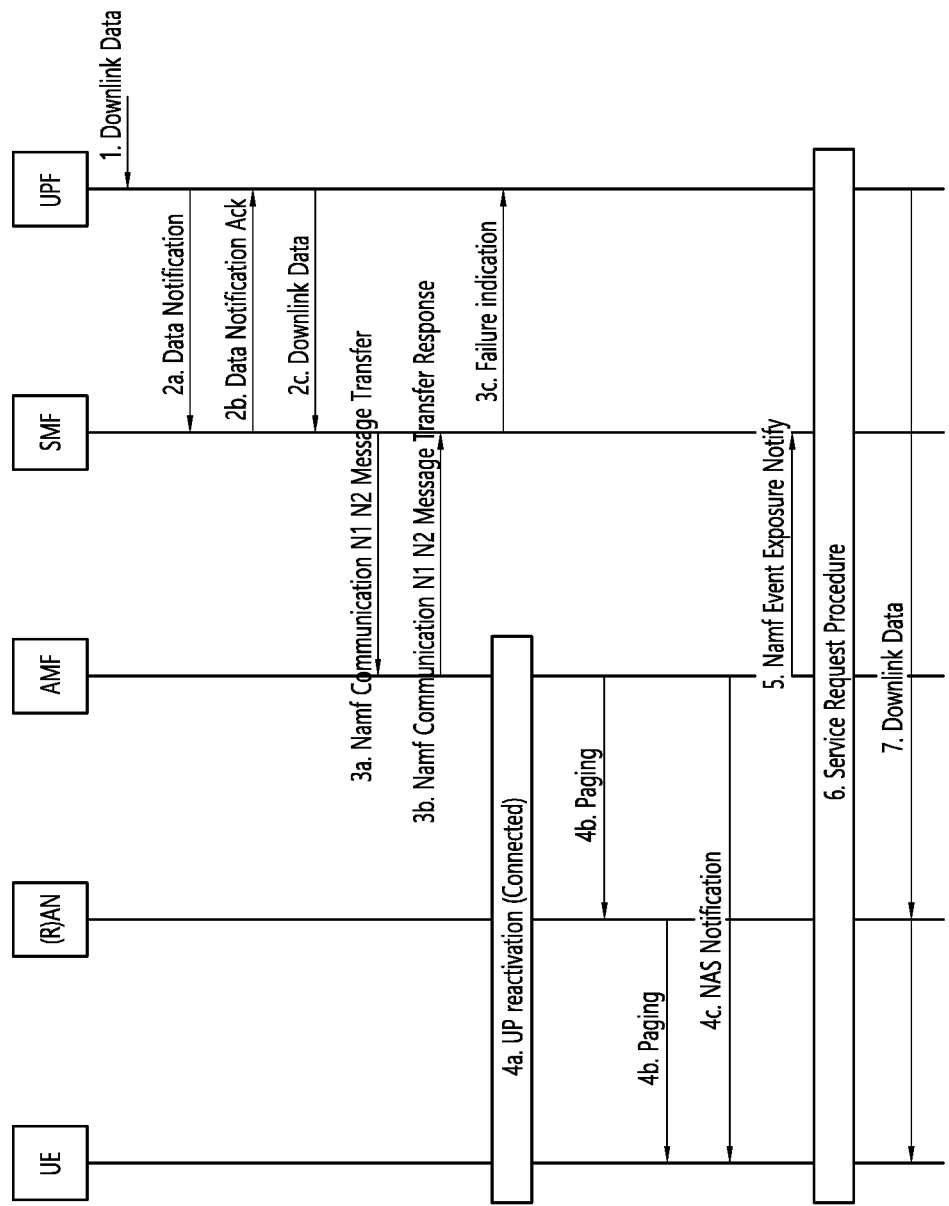
FIG. 13 shows a Network-Triggered Service Request procedure to which the embodiment of this specification can be applied.

FIG. 13 shows a Network-Triggered Service Request procedure to which the embodiment of this specification can be applied.

Referring to FIG. 13, a Network-Triggered Service Request procedure may be performed according to the following procedure.

Step 1: If the UPF receives downlink data for a PDU session, and if AN tunnel information stored in the UPF for the PDU session does not exist, based on an indication received from the SMF, the UPF may store the downlink data in a buffer or may forward the downlink data to the SMF.

Step 2a: The UPF may transmit Data Notification to the SMF. The Data Notification may include N4 session ID, Information to identify the QoS Flow for the downlink data (or DL data packet), DSCP, and so on.

Step 2b: The SMF may transmit a Data Notification Ack to the UPF.

Step 2c: The UPF may forward the downlink (DL) data packet to the SMF.

Step 3a: (conditional) The SMF may request an Namf_Communication_N1N2MessageTransfer to the AMF.

The Namf_Communication_N1N2MessageTransfer may include SUPI, PDU Session ID, N2 SM information (QFI(s), QoS profile(s), CN N3 Tunnel Info, S-NSSAI, Paging Policy Indication), Area of validity for N2 SM information, ARP, Paging Policy Indication, and 5QI.

The SMF determines an AMF, and the SMF applies (or invokes) a Namf_Communication_N1N2MessageTransfer to the AMF including a PDU session ID, which is received in Step 2a. While waiting for a user plane connection to be activated, if the SMF additionally receives a data notification message for a QoS flow having a higher priority than a data notification message, which was previously received by the SMF, the SMF may apply a new Namf_Communication_N1N2MessageTransfer, which indicates an ARP having a higher priority and PDU session ID, to the AMF.

When the SMF requests an Namf_Communication_N1N2MessageTransfer to the AMF, if N1 signaling is included in the Namf_Communication_N1N2MessageTransfer request of the SMF, the SMF may include information on an access network to which the N1 signaling is to be transmitted in the Namf_Communication_N1N2MessageTransfer request.

Alternatively, the SMF may request the Namf_Communication_N1N2MessageTransfer including the information on the access network to which N1 signaling is to be transmitted.

Step 3b: (conditional) The AMF may respond to the SMF.

If the UE is in the CM-IDLE state for the AMF, and if the AMF can perform paging to the UE, the AMF may immediately transmit an Namf_Communication_N1N2MessageTransfer Response to the SMF. The Namf_Communication_N1N2MessageTransfer Response message may include "Attempting to reach UE" as a response cause. When the AMF is reachable to the UE, the "Attempting to reach UE" may ignore (or disregard) N2 SM information, and the AMF may notify the SMF that the SMF may receive a request to provide the N2 SM information once again.

If the UE is in the CM-CONNECTED state for the AMF, the AMF may immediately transmit an Namf_Communication_N1N2MessageTransfer response including "N1/N2 transfer success", as the response cause, to the SMF.

Step 3c: (conditional) The SMF may respond to the UPF. The SMF may notify a User Plane setup failure to the UPF.

Step 4a: (conditional) If the UE is in the CM-CONNECTED state in an access associated with a PDU session ID, which is received from the SMF, Steps 12-22 of FIG. 9b to FIG. 9c may be performed in order to activate a User Plane connection for the corresponding PDU session without transmitting a paging message to the (R)AN node and the UE. In Step 12 of FIG. 9b, the AMF may not transmit an NAS Service Accept message to the UE, and the remaining procedure may be omitted.

Step 4b: (conditional) If the UE is in the CM-IDLE state in a 3GPP access network, and if the PDU session ID, which is received from the SMF in Step 3a, is associated with the 3GPP access network, and if the AMF has determined to notify the UE through a 3GPP access network, based on a local policy, even if the UE is in the CM-CONNECTED state in the non-3GPP access network, the AMF may transmit a paging message to NG-RAN node(s) through the 3GPP access network.

If the UE is simultaneously registered to 3GPP access network and non-3GPP access network in the same PLMN, if the UE is in the CM-IDLE state for both 3GPP access network and non-3GPP access network, and if the PDU session of Step 3a is associated with the non-3GPP access network, the AMF may transmit a paging message associated with the non-3GPP access network to NG-RAN nodes through the 3GPP access network.

According to an embodiment described in this specification, if N1 signaling is included in a request of the SMF, the AMF may determine an access network to which N1 signaling is to be transmitted, based on information on an access network or information on a validity area, which is received from the SMF.

For example, if the SMF has request N1 signaling to be transmitted through a non-3GPP access network, the AMF may determine to transmit the N1 signaling through the non-3GPP access network. If the UE is in the CM-IDLE mode for non-3GPP, since the UE cannot transmit the N1 signaling, the AMF may notify the SMF that it cannot transmit the N1 signal. Additionally, the AMF may notify to the SMF that the UE is in the CM-IDLE state for non-3GPP.

For example, it will be assumed that, if the UE is in the CM-IDLE state for 3GPP and in the CM-CONNECTED state for non-3GPP, the SMF has requested signaling for a 3GPP PDU session. At this point, if the SMF has requested that the signaling can be transmitted to any access network, the AMF may transmit signaling via non-3GPP instead of paging the 3GPP.

Step 4c: (conditional) If the UE is simultaneously registered to a 3GPP access network and a non-3GPP access network in the same PLMN, if the UE is in the CM-CONNECTED state for the 3GPP access network, and if the PDU session ID of Step 3a is associated with a non-3GPP access network, the AMF may transmit an NAS Notification message including a non-3GPP access type to the UE through the 3GPP access network and may configure (or set up) a Notification timer. At this point, the following Step 5 may be omitted.

If the UE is simultaneously registered to the 3GPP access network and non-3GPP access network in the same PLMN, if the UE is in the CM-CONNECTED state for the non-3GPP access network and in the CM-IDLE state for the 3GPP access network, if the PDU session ID of Step 3a is associated with the 3GPP access network, and, if, based on the local policy, the AMF determines to notify the UE through the non-3GPP access network, the AMF may transmit a NAS Notification message including a 3GPP access type to the UE through the non-3GPP access network and may configure (or set up) a Notification timer.

Step 5: (conditional) The AMF may transmit a Namf_EventExposure_Notify to the SMF. The AMF may supervise the Paging procedure by using the timer. If the AMF fails to receive the response to the Paging Request message from the UE, the AMF may additionally apply paging according to a Paging Strategy, which is described in Step 4b.

Step 6: If the UE is in the CM-IDLE in the 3GPP access network, and if the UE receives a Paging request for a PDU session associated with a 3GPP access network, the UE may initiate the UE-Triggered Service Request procedure. In Step 4a of FIG. 9a, the AMF may transmit a Nsmf_PDUSession_UpdateSMContext request to SMF(s) associated with a PDU session, which is identified in the Service Request message, with the exception for a PDU session ID that is included in the Namf_Communication_N1N2MessageTransfer of Step 3a. In order to support forwarding of the buffered data, the SMF may instruct the UPF to configure a data forwarding tunnel between the old UPF and a new UPF or PSA.

If the UE is in the CM-IDLE state in both the non-3GPP access network and the 3GPP access network, and if the UE receives a Paging request for a PDU session associated with the non-3GPP access network, the UE may initiate the UE-Triggered Service Request procedure, which includes a List Of Allowed PDU Sessions that can be reactivated through the 3GPP access network according to the UE's policy. If a PDU session that can be reactivated through the 3GPP access network does not exist, the UE may include an empty List Of Allowed PDU Sessions. If the AMF receives a Service Request message from the UE through the non-3GPP access network, the AMF may suspend the Paging procedure and may carry out the received Service Request procedure. If the AMF receives a Service request message, and if the List Of Allowed PDU Sessions, which is provided by the UE, does not include the PDU session that is paged by the UE, as shown in Step 4a of FIG. 9a, by invoking an Namf_EventExposure_Notify service, although the AMF is reachable to the UE, the AMF may notify the SMF that the UE has not accepted to reactivate the PDU session.

If the UE is in the CM-IDLE state for the non-3GPP access network, if the UE is in the CM-CONNECTED state for the 3GPP access network, and if the UE has received an NAS Notification message including a non-3GPP access type through the 3GPP access network, the UE may initiate the UE-Triggered Service Request procedure, which includes a List Of Allowed PDU Sessions that can be reactivated through the 3GPP access network according to the UE's policy. If a PDU session that can be reactivated through the 3GPP access network does not exist, the UE may include an empty List Of Allowed PDU Sessions. If the AMF receives a Service request message, and if the List Of Allowed PDU Sessions, which is provided by the UE, does not include the PDU session that is paged by the UE, by invoking an Namf_EventExposure_Notify service, although the AMF is reachable to the UE, the AMF may notify the SMF that the UE has not accepted to reactivate the PDU session. If the AMF receives a Service Request message from the UE through the non-3GPP access network, the AMF suspends the Notification timer and may carry out the received Service Request procedure.

If the UE is in the CM-IDLE state for the 3GPP access network, if the UE is in the CM-CONNECTED state for the non-3GPP access network, and if the UE has received a NAS Notification message, which identifies the 3GPP access type, through the non-3GPP access network, when the 3GPP access network is available for usage, the UE may initiate the UE-Triggered Service Request procedure. If the AMF fails to receive a Service Request message before the Notification timer expires, the AMF may page the UE through the 3GPP access or may notify to the SMF that the UE was unable to reactivate the PDU session.

Step 7: The UPF may transmit buffered downlink data to the UE through a (R)AN node, which has performed the Service Request procedure. If the procedure is triggered due to requests made by other network entities, the network may transmit downlink signaling.

Meanwhile, if dynamic Policy and Charging Control (PCC) is deployed, an SM signal being transmitted by the SMF to the UE may be based on an input of a Policy Control Function (PCF). The PCF may provide, to the SMF, information on an access network intending to transmit signaling. For example, when the PCF requests an ATSSS rule to the SMF in order to provide the ATSSS rule to the UE, information on an access network that is to transmit the ATSSS rule may be provided to the SMF. The SMF may generate an SM signal including the ATSSS rule in order to transmit the ATSSS rule, which is received from the PCF, and may transmit the generated SM signal to the AMF. The SMF may transmit, to the AMF, the SM signal together with information on the access network to which the SM signal is to be transmitted.

If the SMF requests the SM signal to be transmitted through the non-3GPP access network (i.e., if the information on the access network that is to transmit the ATSSS rule indicates the non-3GPP access network), the AMF may transmit signaling to the non-3GPP access network. At this point, if the UE is in CM-IDLE for non-3GPP, since the signaling cannot be transmitted to the UE, the AMF may notify the SMF that the signaling cannot be transmitted ("transmission not available"). Additionally, the AMF may notify to the SMF that the UE is in the CM-IDLE state for the non-3GPP access network, and the SMF may provide information on "transmission not available" to the PCF.

Figure 14:
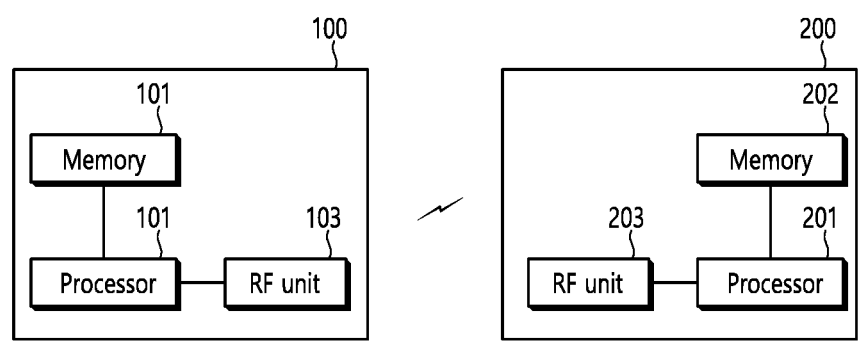
FIG. 14 is a block diagram showing a wireless communication system in which the embodiment proposed in this specification can be implemented.

FIG. 14 is a block diagram showing a wireless communication system in which the embodiment proposed in this specification can be implemented.

A base station (200) includes a processor (201), a memory (202), and a radio frequency (RF) unit (203). The memory (202) is connected to the processor (201) so as to store various information for operating the processor (201). The RF unit (203) is connected to the processor (201) so as to transmit and/or receive radio signals. The processor (201) implements the proposed function(s), process(es), and/or method(s). In the above-described embodiment, operations of the base station may be implemented by the processor (201).

A wireless device (100) includes a processor (101), a memory (102), and a radio frequency (RF) unit (103). The memory (102) is connected to the processor (101) so as to store various information for operating the processor (101). The RF unit (103) is connected to the processor (101) so as to transmit and/or receive radio signals. The processor (101) implements the proposed function(s), process(es), and/or method(s). In the above-described embodiment, operations of the base station may be implemented by the processor (101).

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, and so on). The module is stored in the memory and may be executed by the processor. The memory may exist inside or outside the processor and may be connected to the processor in various known means.

In the above exemplary systems, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Figure 15:
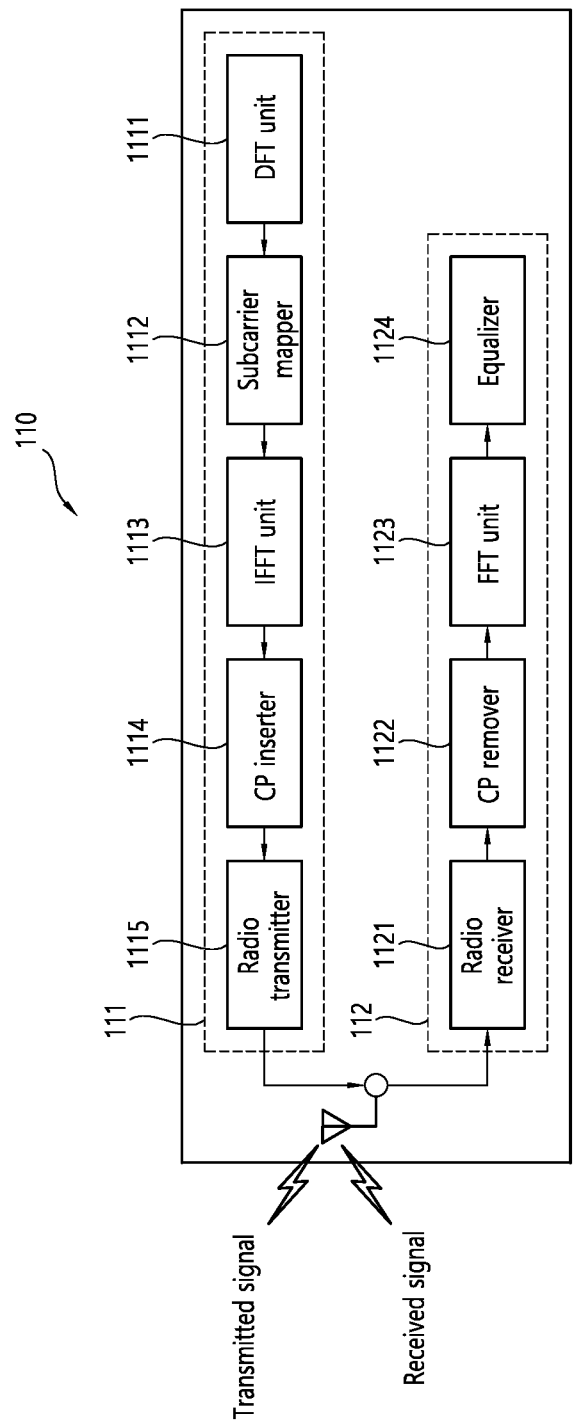
FIG. 15 is a detailed block diagram of a transceiver of a wireless device shown in FIG. 14.

FIG. 15 is a detailed block diagram of a transceiver of a wireless device shown in FIG. 14.

Referring to FIG. 15, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). That is, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

What is claimed is:

1. A method for transmitting a session management (SM) signal to a user equipment (UE) capable of being connected to multiple access networks, the method comprising:
    receiving, by an access and mobility management function (AMF) node, from a session management function (SMF) node, a request for transmitting the SM signal, wherein the request includes information on an access network through which the SM signal is to be transmitted;
    determining, by the AMF node, the access network through which the SM signal is to be transmitted to the UE, based on the information on the access network;
    based on the UE being connected to the AMF node through the determined access network, transmitting, by the AMF node, the SM signal to the UE through the determined access network; and
    based on the UE being not connected to the AMF node through the determined access network, transmitting, by the AMF node, to the SMF node, a state report indicating that the UE is in a connection management (CM)-IDLE state for the determined access network.

2. The method of claim 1, wherein the information on the access network through which the SM signal is to be transmitted indicates that a signal is to be transmitted through an access network associated with a protocol data unit (PDU) session, or that a signal is to be transmitted through a specific access network regardless of an association or non-association with the PDU session.

3. The method of claim 1, further comprising:
    determining whether or not to transmit the SM signal to the UE in accordance with whether or not the UE is connected to the determined access network.

4. The method of claim 1, wherein, based on the UE being not connected to the AMF node through the determined access network, the AMF node does not transmit the SM signal to the UE.

5. The method of claim 4, further comprising:
    based on the UE being not connected to the AMF node through the determined access network, transmitting, by the AMF node, to the SMF node, information indicating that the SM signal cannot be transmitted to the UE through the determined access network.

6. The method of claim 1, further comprising:
    receiving, by the AMF node, from the SMF node, a request for user plane activation, wherein whether or not to perform the user plane activation is determined according to whether or not the UE is connected to the AMF node through the determined access network.

7. The method of claim 1, wherein the request includes information on a validity area through which an SM signal can be transmitted, and
wherein the information on the access network through which the SM signal is to be transmitted is transmitted by using the information on the validity area.

8. The method of claim 7, wherein the validity area is one of a 3GPP access network and a non-3GPP access network.

9. The method of claim 7, wherein the validity area is configured through a tracking area (TA) list.

10. An access and mobility management function (AMF) node capable of being connected to a user equipment (UE) through multiple access networks, the AMF node comprising:
a transceiver receiving a request for transmitting a session management (SM) signal from a session management function (SMF) node; and
a processor controlling the transceiver,
wherein the processor:
determines an access network through which the SM signal is to be transmitted to the UE, based on the information on the access network,
based on the AMF node being connected to the UE through the determined access network, transmits the SM signal to the UE through the determined access network, and
based on the UE being not connected to the AMF node through the determined access network, transmits, to the SMF node, a state report indicating that the UE is in a connection management (CM)-IDLE state for the determined access network.

11. The AMF node of claim 10, wherein the information on the access network through which the SM signal is to be transmitted indicates that a signal is to be transmitted through an access network associated with a protocol data unit (PDU) session, or that a signal is to be transmitted through a specific access network regardless of an association or non-association with the PDU session.

12. The AMF node of claim 10, wherein the processor determines whether or not to transmit the SM signal to the UE in accordance with whether or not the UE is connected to the determined access network.

13. The AMF node of claim 10, wherein, based on the UE being not connected to the AMF node through the determined access network, the processor does not transmit the SM signal to the UE.

14. The AMF node of claim 13, wherein, based on the UE being not connected to the AMF node through the determined access network, the processor transmits, to the SMF node, information indicating that the SM signal cannot be transmitted to the UE through the determined access network.

15. The AMF node of claim 10, wherein the transceiver receives, from the SMF node, a request for user plane activation, and
wherein the processor determines whether or not to perform the user plane activation according to whether or not the UE is connected to the AMF node through the determined access network.

16. The AMF node of claim 10, wherein the request includes information on a validity area through which an SM signal can be transmitted, and
wherein the information on the access network through which the SM signal is to be transmitted is transmitted by using the information on the validity area.

17. The AMF node of claim 16, wherein the validity area is one of a 3GPP access network and a non-3GPP access network.

18. The AMF node of claim 16, wherein the validity area is configured through a tracking area (TA) list.

* * * * *